United States Patent
Kikuchi et al.

(10) Patent No.: US 9,114,683 B2
(45) Date of Patent: Aug. 25, 2015

(54) VEHICLE CONTROL DEVICE AND METHOD

(71) Applicant: NISSAN MOTOR CO., LTD., Kanagawa (JP)

(72) Inventors: Hironobu Kikuchi, Isehara (JP); Katsuhiko Hirayama, Isehara (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/387,010

(22) PCT Filed: Nov. 2, 2012

(86) PCT No.: PCT/JP2012/078462
§ 371 (c)(1),
(2) Date: Sep. 22, 2014

(87) PCT Pub. No.: WO2013/140657
PCT Pub. Date: Sep. 26, 2013

(65) Prior Publication Data
US 2015/0046035 A1 Feb. 12, 2015

(30) Foreign Application Priority Data

Mar. 23, 2012 (JP) .................. 2012-067073
Oct. 30, 2012 (JP) .................. 2012-238932

(51) Int. Cl.
*B60R 22/00* (2006.01)
*B60K 17/24* (2006.01)
(Continued)

(52) U.S. Cl.
CPC .......... *B60G 17/015* (2013.01); *B60G 17/0195* (2013.01); *B60G 17/06* (2013.01); *B60W 10/04* (2013.01); *B60W 10/06* (2013.01); *B60W 10/184* (2013.01); *B60W 10/22* (2013.01);
(Continued)

(58) Field of Classification Search
CPC ............... B60G 17/0195; B60G 17/06; B60G 2500/10; B60G 17/0165; B60G 2400/204; B60G 2400/208; B60G 2400/91; B60G 17/016; B60G 17/0182; B60G 2400/30; B60G 2400/41; B60G 2400/821; B60G 2800/014; B60G 17/018; B60G 17/0152; B60G 17/0162; B60G 2400/0511; B60G 2400/0512; B60G 2400/102; B60G 2400/104; B60G 2400/40; B60G 2500/104
USPC ............ 701/48, 36, 37, 38, 70; 180/141, 312, 180/902; 188/266.1, 266.2, 281; 280/5.515, 280/5.519, 707, 840, 703, 5.51, 5.512, 280/5.507, 6.159; 248/550, 636
See application file for complete search history.

(56) References Cited

U.S. PATENT DOCUMENTS

2007/0156314 A1* 7/2007 Tomida ........................... 701/37
2009/0248247 A1* 10/2009 Furuichi et al. ................. 701/37
2012/0101691 A1* 4/2012 Otsuka et al. ................... 701/48

FOREIGN PATENT DOCUMENTS

JP 58-211044 A 12/1983
JP 07-117435 A 5/1995
(Continued)

*Primary Examiner* — Muhammad Shafi
(74) *Attorney, Agent, or Firm* — Young Basile

(57) ABSTRACT

A power source attitude control is performed to suppress changes in the sprung mass behavior of a vehicle, and damping force control for damping force variable shock absorbers is performed to suppress changes in the sprung mass behavior. When the stroke speed is low, the saturation degree of the damping force variable shock absorbers is set smaller than the saturation degree when the stroke speed is high.

21 Claims, 20 Drawing Sheets

(51) Int. Cl.
*B60G 17/015* (2006.01)
*B60G 17/0195* (2006.01)
*B60G 17/06* (2006.01)
*B60W 10/04* (2006.01)
*B60W 10/184* (2012.01)
*B60W 10/22* (2006.01)
*B60W 10/06* (2006.01)

(52) U.S. Cl.
CPC ..... *B60G2400/202* (2013.01); *B60G 2400/252* (2013.01); *B60G 2600/02* (2013.01); *B60G 2800/162* (2013.01); *B60G 2800/916* (2013.01); *B60G 2800/92* (2013.01); *B60G 2800/97* (2013.01); *B60W 2510/105* (2013.01); *B60W 2710/226* (2013.01); *B60W 2720/16* (2013.01)

(56) References Cited

FOREIGN PATENT DOCUMENTS

| | | |
|---|---|---|
| JP | 2005-119548 A | 5/2005 |
| JP | 2007-40496 A | 2/2007 |
| JP | 2010-95211 A | 4/2010 |
| WO | 2011-004471 A1 | 1/2011 |

\* cited by examiner

VEHICLE CONTROL DEVICE AND METHOD

CROSS REFERENCE TO RELATED APPLICATIONS

The present application claims priority to Japanese Patent Application Nos. 2012-067073, filed Mar. 23, 2012 and 2012-238932, filed Oct. 30, 2012, each incorporated herein in its entirety.

TECHNICAL FIELD

The present invention relates to a device and method for controlling the state of a vehicle.

BACKGROUND

As a technique related to a vehicle control device as described in Japanese Patent Application Publication No. Hei 7-117435A has been suggested. Specifically, in order to suppress a sprung behavior when the sprung behavior is produced, the attitude of the vehicle body is stabilized by controlling a damping force of a damping force variable shock absorber.

However, as a result of intensive study of the present inventors, it has been found that, even if the damping force is performed, the vehicle attitude would not be sufficiently stabilized depending on a stroke speed range.

The present invention has been made in view of the problem described above and aims to provide a vehicle control device that may stabilize the vehicle attitude or behavior irrespective of the stroke speed range.

BRIEF SUMMARY

In order to achieve the objective, according to the present invention, when the stroke speed of a damping force variable shock absorber that performs a damping force control to suppress sprung behavior is equal to or less than a predetermined value, the saturation degree of the damping force variable region is set lower than the saturation degree when the stroke speed is greater than the predetermined value so that the damping force control will be performed within a range of the damping force variable region specified or prescribed to the set saturation degree.

Therefore, when the stroke speed is equal to or less than the predetermined value, the damping force variable region is configured to be narrow to thereby limit the damping force control so as to suppress an unnecessary damping force control, whereas, when the stroke speed is greater than the predetermined value, the damping force variable region is configured to be wide to execute the damping control. Thus, the vehicle body attitude or behavior may be sufficiently stabilized irrespective of the stroke speed range.

DESCRIPTION OF EMBODIMENTS

First Embodiment

Figure 1:
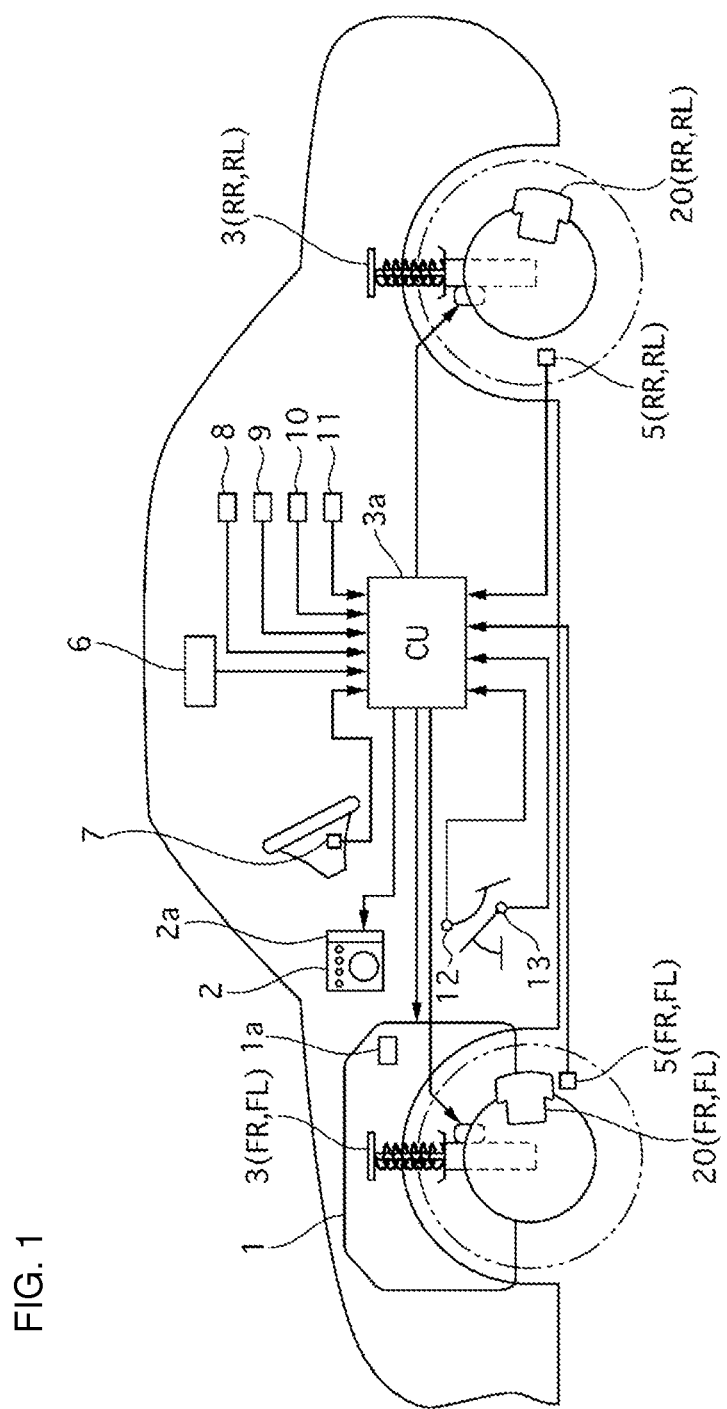
FIG. 1 is a system schematic diagram illustrating a vehicle control device in a first embodiment.

FIG. 1 is a schematic system diagram illustrating a vehicle control device in a first embodiment. The vehicle has an engine 1 as a power source, a brakes 20 configured to generate, for respective wheels, a braking torque by a friction force (hereinafter, when the brake 20 is to be addressed individually, referred to as a front right wheel brake 20FR, a front left wheel brake 20FL, a rear right wheel brake 20RR, and a rear left wheel brake 20RL, respectively), and shock absorbers (S/As) 3 provided between the vehicle body and the respective wheels and capable of performing control using a variable damping force (hereinafter, when the shock absorbers 3 is to be addressed individually, reference will be made to a front right wheel S/A 3FR, a front left wheel S/A 3FL, a rear right wheel S/A 3RR, and a rear left wheel S/A 3RL, respectively).

The engine 1 has an engine controller 1a (corresponding to a power source control means, hereinafter, also referred to as an engine control unit) configured to control a torque to be outputted from the engine 1. The engine controller 1a controls the operation conditions of the engine 1 (such as an engine speed and an engine output torque) as desired, by controlling the position of the throttle valve, the amount of fuel consumption, an ignition timing, and the like of the engine 1. Further, the brakes 20 generate a braking torque based on the hydraulic pressure supplied by a brake controlling unit 2 capable of controlling the pressure of the brake fluid for each wheel according to the traveling states. The brake control unit 2 has a brake controller 2a (also referred to as a brake control unit) configured to control the braking torque generated by the brakes 20. The brake controller 2a generates a desired hydraulic pressure for the brakes 20 of the respective wheels through opening and closing operations of multiple electromagnetic valves, using a master cylinder pressure generated by brake depression of the driver or a pump pressure generated by an incorporated motor drive pump as its hydraulic pressure source.

The S/A 3 is a damping force generating device configured to damp the elastic motion of a coil spring provided between an unsprung mass (such as axles and wheels) and a sprung mass (such as the vehicle body) of the vehicle. The S/A 3 is configured to be able to change the damping force through operations of the actuators. The S/A 3 has a cylinder in which fluid is enclosed or filled, a piston that strokes inside the cylinder, and an orifice controlling the fluid movement between an upper and a lower fluid chambers formed above and below the piston, respectively. The piston has multiple orifices having different orifice sizes, and an appropriate orifice in accordance with a received control instruction is selected from the multiple orifices when the S/A 3 is actuated. Thus a damping force according to the size of the selected orifice can be generated. For example, when the selected orifice size is small, the movement of the piston is more restricted to make the damping force large; when the orifice size is large, the movement of the piston is less restricted so as to make the damping force small.

Note that the method of changing damping force is not limited to selecting the orifice size. Alternatively, for example, the damping force may be changed by controlling the opening position of an electromagnetic control valve located in a communication channel formed between the upper side and lower side of the piston to allow fluid communication. The S/A 3 has an S/A controller 3a (a damping-force controlling means) configured to control the damping force of each of the S/A 3 through operation of the orifice size of the S/A 3.

The vehicle also has wheel speed sensors 5 each configured to detect the wheel speed of the corresponding wheel (hereinafter, when a wheel speed corresponding to an individual wheel is intended, reference is made to a right front wheel speed: 5FR, left front wheel speed: 5FL, right rear wheel speed: 5RR, and left rear wheel speed: 5RL), an integrated sensor 6 configured to detect a longitudinal acceleration, a yaw rate, and a lateral acceleration acting on the center of gravity of the vehicle, a steering angle sensor 7 configured to detect a steering angle which indicates the amount of steering inputted by the driver, a vehicle speed sensor 8 configured to detect the speed of the vehicle, an engine torque sensor 9 configured to detect an engine torque, an engine speed sensor 10 configured to detect the speed of the engine, a master cylinder pressure sensor 11 configured to detect a master cylinder pressure, a brake switch 12 configured to output an on-state signal when the brake pedal is operated, and an accelerator position sensor 13 configured to detect the position of the accelerator pedal. Signals from these various sensors are inputted to the engine controller 1a, the brake controller 2a, and the S/A controller 3a when needed. Note that the location of the integrated sensor 6 is not limited to the center of gravity of the vehicle, and may be located at any other position as long as the integrated sensor 6 can estimate various values at the center of gravity. In addition, the integrated sensor 6 does not have to be integrated, and the yaw rate, the longitudinal acceleration, and the lateral acceleration may be detected individually or separately.

(Overall Configuration of the Vehicle Control Device) In the vehicle control device in the first embodiment, three actuators are used to control vibrations generated in the sprung mass. In this vibration control, the controls of the sprung-mass state performed by these actuators interfere with each other. In addition, since an element controllable by the engine 1, an element controllable by the brake 20, and an element controllable by the S/A 3 is different from one another, there is a problem on how these elements should be combined to be controlled.

For example, the brake 20 can control the bounce motion and the pitch motion, but controlling both of these motions at the same time tends to cause the driver to experience a strong deceleration feel and thus discomfort. The S/A 3 can control all the roll motion, bounce motion, and pitch motion. However, if the S/A 3 performs a wide-range control on these motions, the manufacturing cost for the S/A 3 increases. Moreover, a large damping force tends to be generated, which would make it likely for high-frequency vibrations to be inputted from the road surface. This gives the driver discomfort, too. In other words, the following tradeoff relation exists. Control by the brake 20 does not deteriorates the high-frequency vibration characteristics but increases a deceleration feel, while control by the S/A 3 does not increase the deceleration feel but causes high-frequency vibrations to be inputted.

Therefore, these problems are evaluated comprehensively so that the vehicle control device of the first embodiment may achieve a control configuration which makes use of the advantages of respective actuators in the control performances, and at the same time, compensates for each other's disadvantages. To implement such a vehicle control device which is excellent in its damping ability, yet can be manufactured cost-effectively, the overall control system is constructed while mainly taking the following points into consideration.

(1) Suppress the amount of control by the S/A 3 by performing controls by the engine 1 and the brake 20 in parallel.

(2) Resolve the deceleration feel caused by control through the brake 20 by limiting the object control movement by the brake 20 to the pitch motion only.

(3) Output restrictively the control amounts by the engine 1 and the brake 20 than actually available so as to mitigate the discomfort caused through these, while reducing the load on the S/A 3.

(4) Perform a skyhook control by each actuator. At this time, without using a stroke sensor, a sprung or unsprung sensor and the like, which are generally required for the skyhook control, by using a wheel speed sensor installed in every vehicle, the skyhook control is performed using a wheel speed sensor installed in every vehicle to achieve the skyhook control with less expensive configuration.

(5) When performing the sprung-mass control by S/A 3, introduce a scalar control (frequency sensitive control) to handle input of high frequency vibrations which is difficult to be coped with by a vector control such as a skyhook control.

(6) Provide an appropriate control mode in accordance with traveling states, by appropriately selecting the control mode achieved by the S/A 3 according to the traveling conditions.

These are the outline of the overall control system configured in the embodiment. Below, individual details will be described to achieve these.

Figure 2:
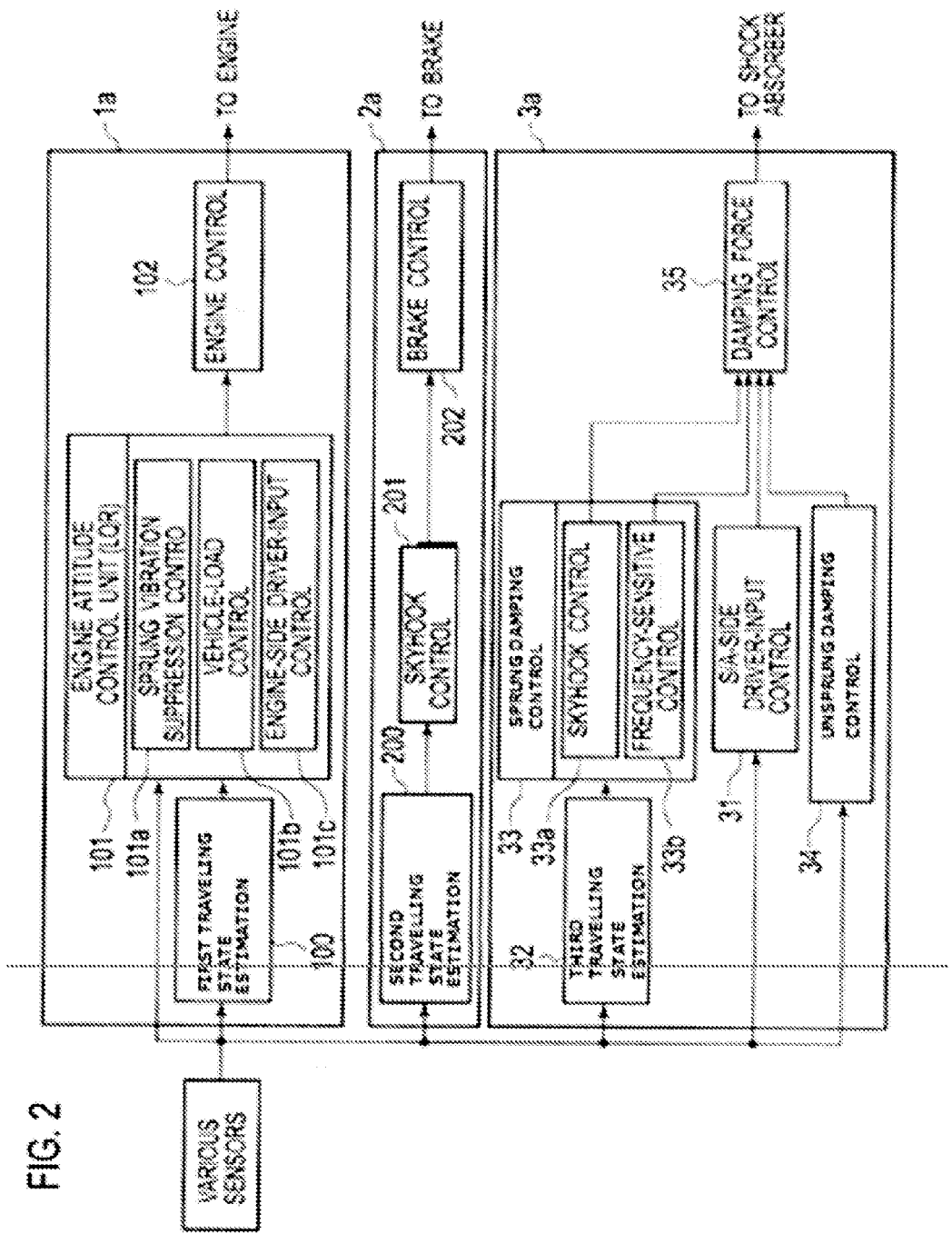
FIG. 2 is a control block diagram illustrating a control configuration of the vehicle control device in the first embodiment.

FIG. 2 is a control block diagram illustrating the control configuration of the vehicle control device in the first embodiment. The vehicle control device in the first embodiment is comprised of three controllers, i.e., an engine controller 1*a*, a brake controller 2*a*, and an S/A controller 3*a*. Each of these controllers constitutes a feedback control system based on a wheel speed.

Although the configuration of the first embodiment has three controllers, the present invention is not particularly limited. For example, these controllers may be integrated into a single controller. The configuration of the first embodiment has three controllers because it is supposed that the vehicle control device of the first embodiment may be implemented by using the existing engine controller and brake controller to form an engine control unit 1*a* and a brake control unit 2*b*, respectively, and by additionally installing the S/A controller 3*a* to thereby achieve the vehicle control in the first embodiment.

(Configuration of the Engine Controller) The engine controller 1*a* has a first traveling-state estimation unit 100 configured to estimate a stroke speed of each wheel, a bounce rate, a roll rate, and a pitch rate used for a sky hook control for a sprung-mass vibration suppression control unit 101*a* described below mainly based on the wheel speed detected by the wheel speed sensor, an engine attitude or behavior control unit 101 configured to calculate an engine attitude control amount representative of an engine torque instruction, and an engine control unit 102 configured to control the operating state of the engine 1 based on the engine attitude control amount calculated. Note that the estimating process of the first travelling state estimation unit will be detailed below.

The engine attitude control unit 101 includes a sprung mass vibration suppression or damping control unit 101*a* configured to calculate a sprung-mass control amount for suppressing the bounce motion and the pitch motion by a skyhook control, a vehicle-load control unit 101*b* configured to calculate a control amount for suppressing fluctuations in the vehicle load between the front wheels and the rear wheels, and an engine-side driver-input control unit 101*c* configured to calculate a yaw-response control amount suited for the vehicle behavior that the driver desires to be accomplished, based on signals from the sensors such as the steering angle sensor 7 and the vehicle-speed sensor 8. The engine attitude control unit 101 calculates, through optimum control (LQR), an engine attitude control amount which is the minimum control amount of the control amounts calculated by these control units, and outputs the final engine attitude control amount to the engine controller 102. Since the engine 1 suppresses the bounce motion and the pitch motion in this manner, the damping force control amount by the S/A 3 can be reduced, which contributes to avoiding deteriorating the high-frequency vibration characteristics. Further, since the S/A 3 can focus on suppressing the roll motion, the roll motion can be suppressed effectively.

(Configuration of the Brake Controller) The brake controller 2*a* includes a second traveling state estimation unit 200 configured to estimate a stroke speed of each wheel, a pitch rate and the like based on the wheel speed detected by the wheel speed sensor 5, a skyhook control unit 201 (to be detailed below) configured to calculate a brake attitude control amount based on a skyhook control which in turn based on the estimated stroke speed and the pitch rate, and a brake control unit 202 configured to control the braking torque of each brake 20 based on the calculated brake attitude control amount. Note that in the first embodiment, the same estimation process is adopted as the estimation process for the first travelling state estimation unit 100 and a second travelling state estimation unit 200. However, another estimation method may be used when the process is conducted based on the wheel speed. Thus, since the brakes 20 suppress the pitch motion, the damping force control amount by the S/A 3 can be reduced, which can contribute to avoiding deteriorating the high-frequency vibration characteristics. Further, since the S/A 3 can focus on suppressing the roll motion, the roll motion can be suppressed effectively.

(Configuration of the S/A Controller) The S/A controller 3*a* includes a driver-input control unit 31 configured to perform a driver-input control for attaining a desired vehicle attitude based on driver's operations (such as a steering operation, an accelerator operation, and a brake-pedal operation), a third traveling-state estimation unit 32 configured to estimate traveling states based on detection values of the various sensors (mainly the wheel speed sensor value of the wheel speed sensor 5), a sprung-mass damping control unit 33 configured to control the vibrations of the sprung mass based on the estimated traveling states, an unsprung-mass damping control unit 34 configured to control the vibrations of the unsprung mass based on the estimated traveling states, and a damping-force control unit 35 configured to perform a damping-force control for the S/A 3 by determining a dumping force to be set for the S/A 3 based on: the shock-absorber attitude control amount outputted from the driver-input control unit 31, the sprung-mass vibration suppression control amount outputted from the sprung-mass damping or vibration suppression control unit 33, and the unsprung-mass vibration suppression control amount outputted from the unsprung-mass damping control unit 34.

In the first embodiment, as described above, the same estimation method is used as the estimation process in the first travelling state estimating unit 100, the second travelling state estimation unit 200, and the third travelling state estimation unit 32, as long as the estimating process is made based on the wheel speed, other estimation process may be used without specific limitation.

Figure 3:
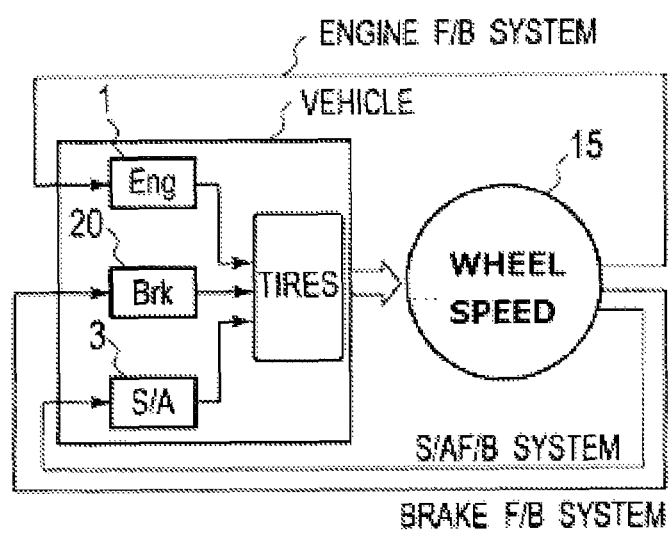
FIG. 3 is a conceptual diagram illustrating the configuration of a feedback control systems for a wheel speed in the first embodiment.

Note that, in the Embodiment 1, in all actuators a feedback control system using the wheel speed sensor 5 is constituted. FIG. 3 is a conceptual diagram illustrating the configurations of a wheel speed feedback control systems of Embodiment 1. The engine 1, the brakes 20 and the S/A 3 constitutes individually an engine feedback control system, a brake feedback control system, and a S/A feedback control system. When, at this time, if each actuator is operated individually without monitoring an actuator mutually, a problem of control interference would arise. However, the influence due to the control of each actuator will be reflected in fluctuations or changes in wheel speed However, the influence on each actuator by the other actuators appears in a stroke speed. Thus, configuring the feedback control systems based on the stroke speed results in monitoring each other's influence, and therefore avoids control interference. For example, if certain sprung-mass vibrations are suppressed by the engine 1, the variations or fluctuations in the wheel speed are accompanied to appear. Thus, even though the other actuators, namely the brakes 20 and the S/A 3, do not perceive the content of the control performed by the engine 1, the brakes 20 and the S/A 3 will be controlled based on the wheel speed reflecting the influence. In other words, since the feedback control systems are constituted using the wheel speed as common values, even individually controlled without monitoring each other's control, as a result, the control is performed as if they were monitored (this control is referred to as a cooperative control below). Thus, the attitude of the vehicle can be converged in a stabilized direction. Below, a described is given of each feedback control system in order.

(Travelling state estimation unit) First, a description is given of the first, the second, and the third travelling state estimation units provided with each feedback control system as a common constituent or element. In Embodiment 1, the same estimation process is adopted as the estimation process in the first travelling state estimation unit 100, the second travelling estimation unit 200, and the third travelling state estimation unit 32. Thus, since the process of each estimation unit is common, the estimation process in the third travelling state estimation unit 32 is described as a representative. Note that these travelling state estimation units may include estimation models different from one another and are not limited as long as the state estimation is made using a wheel speed.

Figure 4:
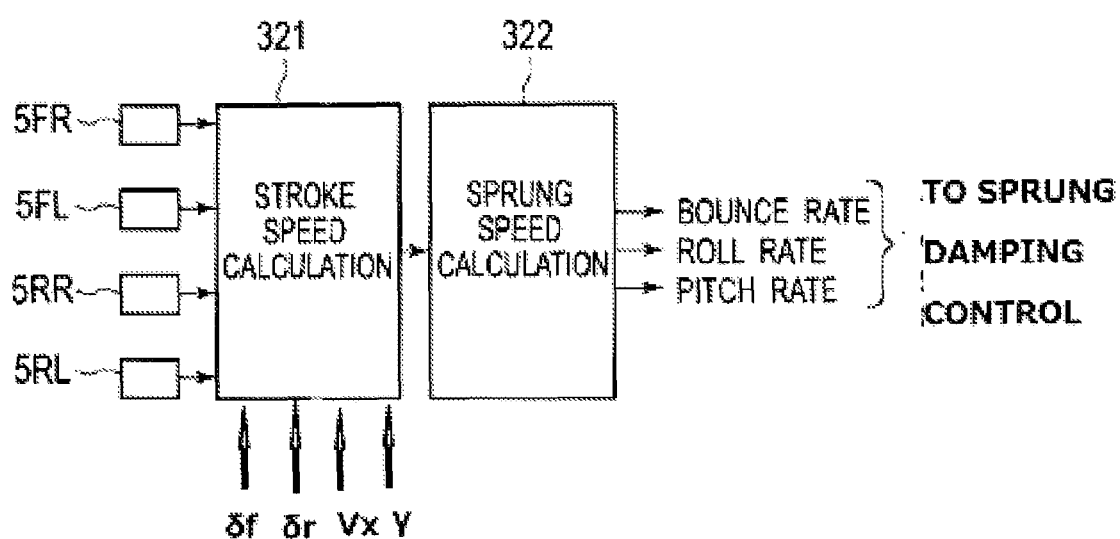
FIG. 4 is a control block diagram illustrating the configuration of a traveling-state estimation unit of the first embodiment.

FIG. 4 is a control block diagram illustrating the configuration of the third traveling state estimation unit 32 of Embodiment 1. In the travelling state estimation unit 32 in the Embodiment 1, basically based on the wheel speed detected by the wheel speed sensor 5, the stroke speed of each wheel, the bounce rate, the roll rate, and the pitch rate are calculated for use in the skyhook control of the sprung mass damping control unit 33 described below. First the values of the vehicle speed sensors 5 of respective wheels are inputted to the stroke speed calculation unit 321 and the sprung mass speed will be calculated from the stroke speeds of respective wheels calculated in the stroke speed calculation unit 321.

Figure 5:
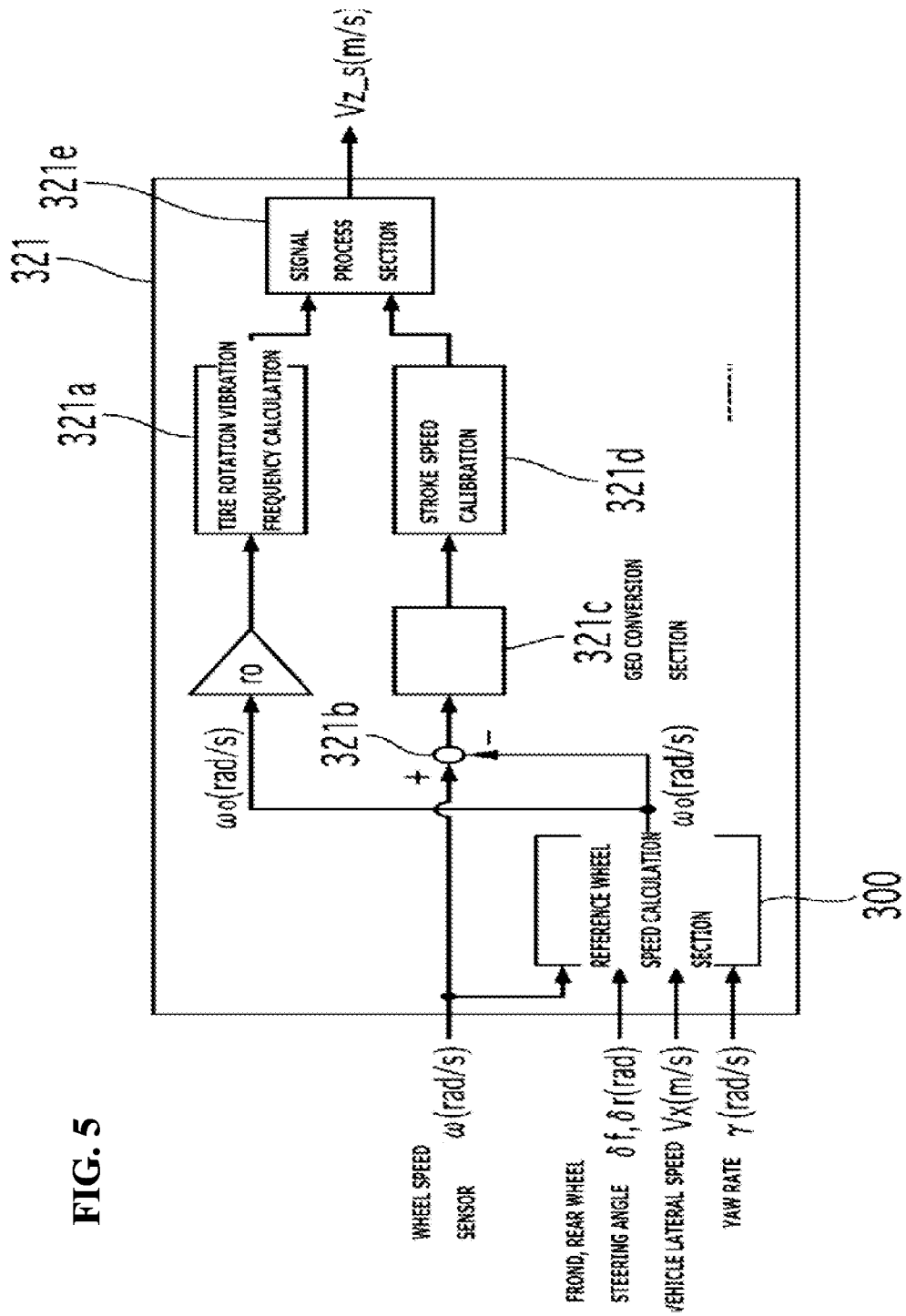
FIG. 5 is a control block diagram illustrating the contents of control in a stroke speed calculation unit.

FIG. 5 is a control block diagram showing the control contents of the stroke speed calculation unit in the first embodiment. The stroke speed calculation unit 321 is provided separately for each wheel and the control block diagram shown in FIG. 5 is the control block diagram focusing on a specific wheel. In the stroke speed calculation unit 321, a reference wheel speed calculation unit 300 is provided that calculates a reference wheel speed based on the values of the wheel speed sensor 5, a front wheel steering angle $\delta f$ detected by the steering angle sensor 7, a rear wheel steering angle $\delta r$ (for the case in which a rear wheel steering device is provided. otherwise, zero is used, appropriately), a vehicle body lateral speed, and an actual yaw rate detected by the integrated sensor 6. Also, a tire rotation vibration frequency calculation unit 321a that calculates a tire rotation vibration frequency based on the calculated reference wheel speed, a deviation calculation unit 321b that calculates a deviation (wheel speed fluctuation) between the reference wheel speed and the vehicle speed sensor value and a GEO conversion unit 321c that converts into an amount of the suspension stroke from the deviation calculated by the deviation calculation unit 321b, and a stroke speed calibration unit 321d that calibrates from the converted stroke amount to a stroke speed, and a signal processing unit 321e that calculates a final stroke speed by applying a band elimination filter in accordance with the frequency calculated by the tire rotation vibration frequency calculation unit 321a to the value calibrated by the stroke speed calibrating unit 321d to remove a tire rotation first-order vibration component.

Figure 6:
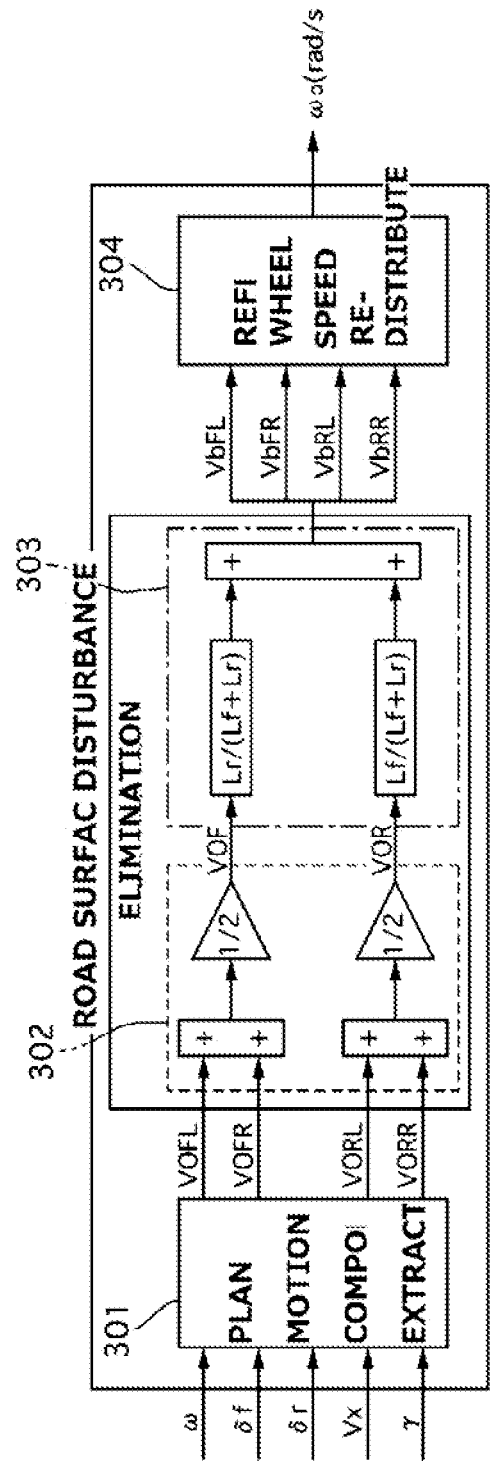
FIG. 6 is a block diagram illustrating the configuration of the reference wheel speed calculation unit.

(Reference wheel speed calculation unit) Now, a description is given of the reference wheel speed calculation unit 300. FIG. 6 is a block diagram illustrating a configuration of the reference wheel speed calculation unit in the first embodiment. The reference wheel speed refers to, among the wheel speeds, a value in which various disturbances have been removed. In other words, the deviation between the wheel speed sensor value and the reference wheel speed is a value that is related to the component which varies according to the bouncing behavior, the rolling behavior, and pitching behavior of the vehicle body or the stroke generated by the unsprung vertical vibrations. In the present embodiment, the stroke speed is estimated based on this deviation.

In a plane motion component extracting unit 301, a first wheel speed V0 as a reference wheel speed of each wheel is calculated based on the vehicle body plan view model taking the wheel speed sensor value as input. Here, assuming the wheel speed sensor value detected by the wheel speed sensor 5 being $\omega$ (rad/s), a front-wheel actual steering angle detected by a steering angle sensor 7 being $\delta f$ (rad), a rear-wheel actual steering angle being $\delta r$ (rad), a vehicle body lateral speed being Vx, a yaw rate detected by the integrated sensor 6 being $\gamma$ (rad/s), a vehicle body speed estimated from the reference wheel speed $\omega 0$ (rad/s) that has been calculated being V (m/s), the reference wheel speeds to be calculated being VFL, VFR, VRL, VRR, the front wheel tread being Tf, the rear wheel tread being Tr, the distance between the vehicle gravity position and the front wheel being Lf, and the distance between the vehicle gravity position and the rear wheel being Lr, respectively, the vehicle body plan view model may be expressed as follows:

$VFL=(V-Tf/2 \cdot \gamma)\cos \delta f+(Vx+Lf \cdot \gamma)\sin \delta f$ $VFR=(V+Tf/2 \cdot \gamma)\cos \delta f+(Vx+Lf \cdot \gamma)\sin \delta f$ $VRL=(V-Tr/2 \cdot \gamma)\cos \delta r+(Vx-Lr \cdot \gamma)\sin \delta r$ $VRR=(V+Tr/2 \cdot \gamma)\cos \delta r+(Vx-Lr \cdot \gamma)\sin \delta r$  Equation (1)

In addition, assuming a normal running time in which no skidding occurs in the vehicle, as the vehicle lateral speed Vx, zero may be inputted. When rewriting these equations by setting V as a reference value, these can be expressed as follows. When rewriting, V is described for each wheel as V0FL, V0FR, V0RL, and V0 RR (corresponding to the first wheel speed).

$$V0FL=\{VFL-Lf\cdot\gamma\sin\delta f\}/\cos\delta f+Tf/2\cdot\gamma$$

$$V0FR=\{VFR-Lf\cdot\gamma\sin\delta f\}/\cos\delta f-Tf/2\cdot\gamma$$

$$V0RL=\{VRL+Lr\cdot\gamma\sin\delta r\}/\cos\delta +Tr/2\cdot\gamma$$

$$V0RR=\{VRR+Lf\cdot\gamma\sin\delta f\}/\cos\delta r-Tr/2\cdot\gamma \quad \text{Equation (2)}$$

In the roll disturbance elimination unit 302, a second wheel speed V0F, V0R representative of a reference wheel speed of the front and rear wheels based on the vehicle front view model taking a first wheel speed V0 as input. The vehicle front view model is intended to remove a wheel speed difference that occurs due to a roll movement occurring, when viewed from the vehicle front, about a vertical line, roll rotation center passing the vehicle center of gravity, and may be expressed by the following equation;

$$V0F=(V0FL+V0FR)/2$$

$$V0R=(V0RL+V0RR)/2$$

Thus, the second wheel speed V0F, V0R removing disturbance due to rolling movement may be obtained.

In the pitch disturbance elimination unit 303, third wheel speeds VbFL, VbFR, VbRL, and VbRR are calculated based on a vehicle body side view model and taking the second wheel speeds V0F, V0R as input. Here, the vehicle body side-view model is intended to eliminate the wheel speed difference due to a pitch motion generated about a vertical line, pitch rotation passing through the vehicle center of gravity, and may be expressed by the following equations.

$$VbFL=VbFR=VbRL=VbRR=\{Lr/(Lf+Lr)\}V0F+\{Lf/(Lf+Lr)\}V0R \quad \text{(Equation 3)}$$

In the reference wheel speed redistribution unit 304 the reference wheel speed ω0 is calculated by first assigning V, VbFL (=VbFR=VbRL=VbRR) in the vehicle body plan view model shown by (Equation 1) to obtain final reference wheel speeds VRL, VFR, VRL, and VRR followed by dividing by the tire radius r0, respectively.

As described above, once the reference wheel speed ω0 for each wheel has been calculated, the deviation of the reference wheel speed ω0 and the wheel speed sensor value is calculated. Since this deviation represents the wheel speed fluctuations associated with the suspension stroke, this may be converted to a stroke speed Vz_s. Basically, in order to hold the respective wheels, the suspensions are not only subjected to a vertical stroke, the wheel rotation centers moves longitudinally along with the stroke and the axle itself installed with the wheel speed sensor 5 has the inclination to thereby produce a difference in a rotation angle. Accompanied by this longitudinal movement, the wheel speed changes so that the deviation between the reference wheel speed and the wheel speed sensor value may be extracted as the fluctuations associated with this stroke. Note that the degree of fluctuations may be set appropriately depending on the suspension geometry variations.

In the stroke speed calculation unit 321, each of the stroke speeds Vz_sFL, Vz_sFR, Vz_sRL, and Vz_sRR for respective wheels has been calculated; the bounce rate, roll rate, and pitch rate for the skyhook control will be calculated in the sprung mass speed calculation unit 322.

(Estimation Model) In the skyhook control, the attitude of the sprung mass is controlled using a damping force that is set based on a relationship between the stroke speed of the S/A 3 and the speed of the sprung mass so as to achieve a flat or level attitude of the running vehicle. In order to perform control of the attitude of the sprung mass through the skyhook control, the speed of the sprung mass needs to be feed backed. Here, since the detectable value from the wheel speed sensor 5 is a stroke speed and a vertical acceleration sensor and the like is not separately provided on the sprung mass, it is necessary to estimate the sprung mass velocity using an estimation model. A description is given below of problems associated with the estimation model as well as the configuration to be adopted by the estimation model.

Figure 7A:
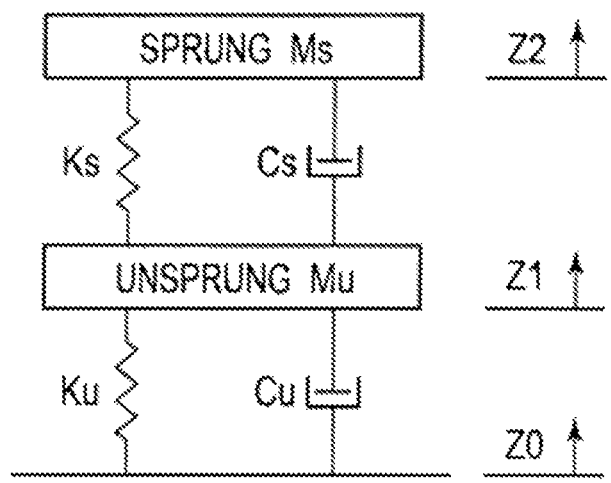
FIG. 7A is a schematic diagram illustrating a vehicle body vibration model for a vehicle with S/A of a constant damping force (referred to as a conventional vehicle below)
Figure 7B:
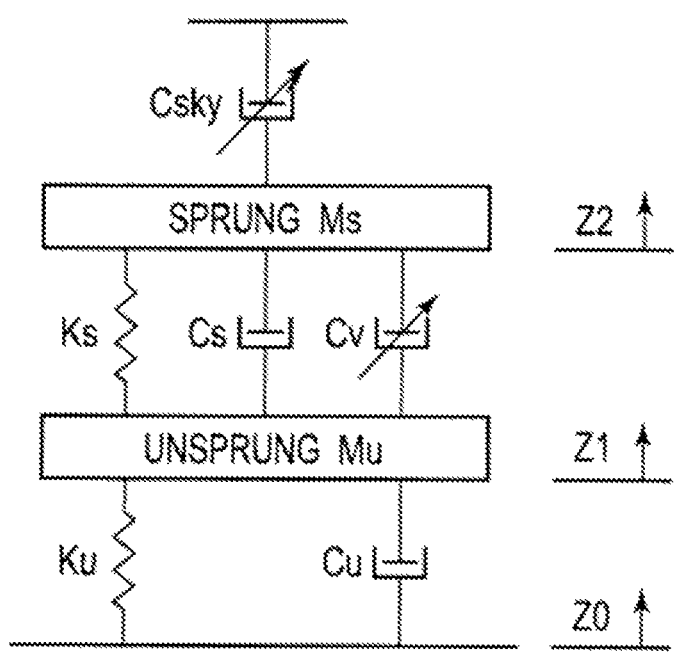
FIG. 7B is a schematic diagram illustrating a model for a vehicle that performs a skyhook control with S/A capable of varying their damping force.

FIGS. 7A, 7B are schematic diagrams illustrating a vehicle body vibration model, FIG. 7A shows a model for a vehicle with S/A of a constant damping force (referred to as a conventional vehicle below), while FIG. 7B shows a model for a vehicle that performs a skyhook control with S/A capable of varying their damping force. In FIGS. 7A and 7B, Ms denotes the weight of the sprung mass, Mu the weight of the unsprung mass, Ks an elastic coefficient of a coil spring, Cs a damping coefficient of the S/A, Ku an elastic coefficient of the unsprung mass (tire), Cu a damping coefficient of the unsprung mass (tire), and Cv a variable damping coefficient. In addition, z2 denotes the position of the sprung mass, z1 the position of the unsprung mass, and z0 the position of the road surface, respectively.

When the model for the conventional vehicle shown in FIG. 7A is used, an equation of motion of the sprung mass is expressed as follows, where the first-order differential (i.e., speed) of z1 is denoted by dz1, and the second-order differential (i.e., acceleration) of z1 is denoted by ddz1, respectively.

$$Ms \cdot ddz2 = -Ks(z2-z1)-Cs(dz2-dz1) \quad \text{(Estimation Equation 1)}$$

This relational expression is organized using Laplace transform as follows.

$$dz2=-(1/Ms)\cdot(1/s2)\cdot(Cs\cdot s+Ks)(dz2-dz1) \quad \text{(Estimation Equation 2)}$$

Since dz2-dz1 represents the stroke speeds Vz_sFL, Vz_sFR, Vz_sRL, and Vz_sRR, the sprung-mass speed can be calculated from the stroke speeds. However, when changing the damping force using the skyhook control, the estimation accuracy significantly decrease. Therefore the model for the conventional vehicle has a problem of not being able to give a large magnitude of attitude control force (to change the damping force).

To solve such a problem, it is conceivable to use the vehicle model shown in FIG. 7B, which is based on the skyhook control. Basically, the change in the damping force involves the change in the force restricting the moving speed of the piston of the S/A 3 in accordance with suspension strokes. Since the S/A 3 used here are of semi-active type, meaning that its piston cannot be actively moved in a desired direction, a semi-active skyhook model is adopted. The sprung mass speed is obtained as follows using the semi-active skyhook model.

$$dz2=-(1/Ms)\cdot(1/s^2)\cdot\{(Cs+Cv)\cdot s+Ks\}(dz2-dz1), \quad \text{(Estimation Equation 3)}$$

where Cv=Csky·{dz2/(dz2-dz1)} when dz2·(dz2-dz1)≥0, and Cv=0 when dz2·(dz2-dz1)<0. In other words, Cv is a discontinuous value.

Here, it is assumed that the sprung mass speed is estimated using a simple filter. In the semi-active skyhook model, when this model is considered as a filter, the respective variables correspond to filter coefficients, and the pseudo-differential term {(Cs+Cv)·s+Ks} includes the discontinuous variable damping coefficient Cv. Thus, the filter responsiveness becomes unstable, which makes impossible to obtain appropriate estimation accuracy. The unstable filter responsiveness causes, in particular, a phase offset. If the relationship or correspondence between the phase and the sign of the sprung mass speed is disrupted, the skyhook control cannot be accomplished. For this reason, even when the semi-active S/A 3 are used, the sprung mass speed is estimated using an active skyhook model which can use a stable Csky value directly without depending on the signs of the sprung mass speed and the stroke speed. The sprung mass speed is obtained as follows using the active skyhook model.

$$dz2=-(1/s)\cdot\{1/(s+Csky/Ms)\}\cdot\{(Cs/Ms)s+(Ks/Ms)\}(dz2-dz1) \quad \text{(Estimation equation 4)}$$

In this case, the pseudo-differential term $\{(Cs/Ms)s+(Ks/Ms)\}$ does not generate discontinuity, and the term $\{1/(s+Csky/Ms)\}$ can be configured with a low-pass filter. As a result, the filter responsiveness becomes stable, and appropriate estimation accuracy can be obtained. Here, even if the active skyhook model is to be adopted, only the semi-active control is available in reality, thus the controllable range will be halved. Thus, the estimated sprung mass speed becomes smaller than the actual speed in a frequency band lower than a sprung mass resonance. However, the most important aspect in the skyhook control is the phase, and as long as the phase-sign relation is maintained, the skyhook control can be accomplished. Further, the sprung mass speed is adjustable by other coefficients and the like. Hence, this is not problematic.

It is understandable from the relation described above that the sprung mass speeds can be estimated once the stroke speeds of the respective wheels are made available. Next, since the actual vehicle does not have one wheel but four wheels, an investigation is made based on which the state of the sprung mass is estimated by a mode decomposition into a roll rate, a pitch rate, and a bounce rate, using the stroke speeds of these respective wheels. When those three components are to be calculated from the stroke speeds of four wheels, one corresponding component is missing, which makes the solution indeterminate. Accordingly, a warp rate indicating a motion of diagonal wheels is introduced. The following formula is established, when the bounce term, the roll term, the pitch term, and the warp term of a stroke amount are denoted by xsB, xsR, xsP, and xsW, respectively, and the stroke amounts corresponding to the stroke speeds Vz_sFL, Vz_sFR, Vz_sRL, and Vz_sRR are denoted by z_sFL, z_sFR, z_sRL, and z_sRR, respectively.

$$\begin{Bmatrix} z\_sFL \\ z\_sFR \\ z\_sRL \\ z\_sRR \end{Bmatrix} = \begin{bmatrix} 1 & 1 & -1 & -1 \\ 1 & -1 & -1 & 1 \\ 1 & 1 & 1 & 1 \\ 1 & -1 & 1 & -1 \end{bmatrix} \begin{Bmatrix} xsB \\ xsR \\ xsP \\ xsW \end{Bmatrix} \Rightarrow \begin{Bmatrix} xsB \\ xsR \\ xsP \\ xsW \end{Bmatrix} = \begin{bmatrix} 1 & 1 & -1 & -1 \\ 1 & -1 & -1 & 1 \\ 1 & 1 & 1 & 1 \\ 1 & -1 & 1 & -1 \end{bmatrix}^{-1} \begin{Bmatrix} z\_sFL \\ z\_sFR \\ z\_sRL \\ z\_sRR \end{Bmatrix} \quad \text{(Equation 4)}$$

From the above relational expression, the differentials dxsB, dxsR, dxsP, and dxsW of xsB, xsR, xsP, and xsW are expressed as follows.

$$dxsB=(\tfrac{1}{4})(Vz\_sFL+Vz\_sFR+Vz\_sRL+Vz\_sRR)$$

$$dxsR=(\tfrac{1}{4})(Vz\_sFL-Vz\_sFR+Vz\_sRL-Vz\_sRR)$$

$$dxsP=(\tfrac{1}{4})(-Vz\_sFL-Vz\_sFR+Vz\_sRL+Vz\_sRR)$$

$$dxsW=(\tfrac{1}{4})(-Vz\_sFL+Vz\_sFR+Vz\_sRL-Vz\_sRR)$$

The relation between the sprung mass speed and the stroke speed has been obtained using Estimation Equation 4 described above. Thus, the bounce rate (dB), the roll rate (dR), and the pitch rate (dP) can be expressed as follows when $-(1/s)\cdot\{1/(s+Csky/Ms)\}\cdot\{(Cs/Ms)s+(Ks/Ms)\}$ in Estimation Equation 4 is described as G, and GB, GR, and GP are set as considering modal parameters (CskyB, CskyR, CskyP, CsB, CsR, CsP, KsB, KsR, and KsPI corresponding to the bounce term, the roll term, and the pitch term of Csky, Cs, and Ks, respectively.

$$dB=GB\cdot dxsB$$

$$dR=GB\cdot dxsR$$

$$dP=GB\cdot dxsP$$

From the description above, the state of the sprung mass of the vehicle can be estimated based on the stroke speeds of the respective wheels.

(Sprung-Mass Vibration Suppression Control Unit) Now, a description is given of the skyhook control executed by the sprung mass vibration suppression control unit 101a, the skyhook control unit 201, and the sprung-mass damping control unit 33. In the skyhook control, control is performed such that the sprung mass state estimated based on the wheel speeds as described above can attain a target sprung mass state. In other words, the change in wheel speed changes corresponding to the sprung mass state, and in order to control the state of the sprung mass, such as the bounce, roll, and pitch, to a target state of the sprung mass, the change in wheel speed detected is controlled to assume the change in wheel speed that corresponds to the target state of the sprung mass.

[Configuration of the Skyhook Control Unit] In the vehicle control device in the first embodiment, an engine 1, brakes 20, and the S/A 3 are provided as three types of actuators to achieve an attitude control of the sprung mass. Among of these, the sprung vibration control unit 101a of the engine controller 1a controls the bounce rate and the pitch rate. The skyhook control unit 201 of the brake controller 2a controls the pitch rate, and the skyhook control unit 33a of the S/A controller 3a controls the bounce rate, the roll rate, and the pitch rate.

The amount of skyhook control in a bounce direction is expressed as follows:

$$FB=CskyB\cdot dB.$$

The amount of skyhook control in a roll direction is expressed as follows:

$$FR=CskyR\cdot dR.$$

The amount of skyhook control in a pitch direction is expressed as follows;

$$FP=CskyP\cdot dP$$

(Skyhook Control Amount FB in a bounce direction FB) The bounce skyhook control amount FB is calculated by the sprung mass vibration suppression control unit 101a as part of an engine attitude control amount, and also by the skyhook control unit 33a as part of an S/A attitude control amount.

(Skyhook Control Amount FR in a roll direction FR) The roll skyhook control amount FR is calculated by the skyhook control unit 33a as part of the S/A attitude control amount.

(Skyhook Control Amount in a pitch direction FP) The pitch skyhook control amount FP is calculated by the sprung-mass vibration suppression control unit 101a as part of the engine attitude control amount, and also, by the skyhook control unit 201 as a brake attitude control amount, and further by the skyhook control unit 33a as part of the S/A attitude control amount, respectively.

In order not to give the driver discomfort, the engine attitude control unit 101 has a limit value for limiting the engine torque control amount corresponding to the engine attitude control amount. The engine torque control amount is limited so that a longitudinal acceleration converted from the engine torque control amount may fall within a predetermined range. Therefore, when the engine attitude control amount (engine torque control amount) calculated based on FB and FP is at or above the limit value, an engine attitude control amount outputted is a skyhook control amount for the bounce rate and the pitch rate obtainable with the limit value. The engine control unit 102 calculates an engine torque control amount based on the engine attitude control amount corresponding to the limit value, and outputs the engine torque control amount to the engine 1. Note that, with respect to the engine attitude control amount, in addition to a positive driving torque, a negative braking torque is available by an engine braking operation, the active control is performed within a limited area in which the engine torque control amount is restricted.

As in the case of the engine 1, in order not to give the driver discomfort, the skyhook control unit 201 has a limit value for limiting a braking-torque control amount (the limit value will be detailed below). The braking-torque control amount is limited so that a longitudinal acceleration converted from the braking-torque control amount may fall within a predetermined range (determined by considering factors such as discomfort experienced by the occupant and life cycle of the actuator). Therefore, when the brake attitude control amount calculated based on the pitch skyhook control amount FP is at or above the limit value, the skyhook control unit 201 outputs a pitch-rate suppression amount (referred to as a brake attitude control amount below) achievable with the limit value to the brake controller 202. The brake control unit 202 calculates a braking torque control amount (or a deceleration) based on the brake attitude control amount corresponding to the limit value, and outputs the braking torque control amount to the brake 20.

Figure 8:
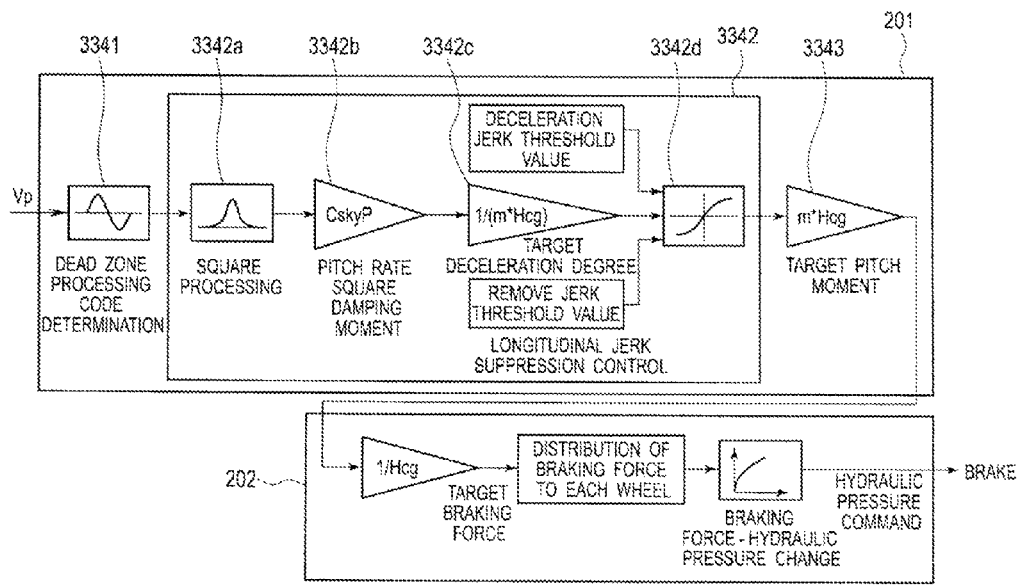
FIG. 8 is a control block diagram illustrating a brake pitch control of the first embodiment.

[Brake Pitch Control] A description is now given of a brake pitch control. Generally, since both the bounce and pitch are controllable by the brakes 20, it might be preferable that both of them be controlled. However, the present invention adopts a configuration in which the brakes 20 are dedicated to the pitch control, because the bounce control has the following tendency. Specifically, the bounce control for the brakes 20 causes all the brakes 20 of the four wheels to thereby generate a braking force at the same time. For this reason, despite that the control in the bounce direction is low in a control priority and control effect is hard to be attained, a strong deceleration feel is experienced by the driver, which is likely to cause driver to feel discomfort. FIG. 8 is a control block diagram illustrating the brake pitch control in the Embodiment 1. The following relational expressions is established when "m" denotes the mass of the vehicle body, BFf denotes a braking force of the front wheels, BFr denotes a braking force of the rear wheels, Hcg denotes the height of the vehicle center of gravity from the road surface, "a" denotes the acceleration of the vehicle, Mp denotes a pitch moment, and Vp denotes a pitch rate.

$$BFf + BFr = m \cdot a$$

$$m \cdot a \cdot Hcg = Mp$$

$$Mp = (BFf + BFr) \cdot Hcg$$

When the pitch rate Vp is positive, i.e., the front-wheel side is sinking or dives, no braking force is given. This is because; in this case, a braking force would cause the front-wheel side to sink or dive further, promoting the pitch motion. On the other hand, when the pitch rate Vp is negative, i.e., the front-wheel side is lifted, a braking force is given by a braking pitch moment to suppress the lifting of the front-wheel side. Thus, the field of vision of the driver is secured to make it easier to see ahead, which contributes to improvement in a sense of security and the sense of being level. Thus, the control amount given is expressed as follows:

$$Mp = 0 \text{ when } Vp > 0 \text{ (when front wheels dive)}$$

$$Mp = CskyP \cdot Vp \text{ when } Vp \leq 0 \text{ (when front wheels lift)}.$$

In this way, a braking torque is generated only when the front side of the vehicle is lifted. Thus, compared to a case of generating a braking torque also when the front side of the vehicle is sinking, a generated deceleration can be decreased. Moreover, since the frequency of actuating the actuator can be reduced by half, a low-cost actuator can be used.

Based on the above relations, the brake attitude control amount calculation unit 334 is composed by the control blocks below. That is, a dead-zone processing code determination unit 3341 is configured to determine the sign of the inputted pitch rate Vp. Then, when the pitch rate Vp is positive, the dead-zone processing code determination unit 3341 outputs 0 (zero) to a deceleration-feel mitigation processing unit 3342 because no pitch control is necessary. When the pitch rate Vp is negative, the dead-zone processing code determination unit 3341 judges that the pitch control can be performed and outputs a pitch rate signal to the deceleration-feel mitigation processing unit 3342.

[Deceleration Feel Mitigation Process] Now, a deceleration feel mitigation process is described. This process is performed by the brake attitude control amount calculation unit 334 and corresponds to the above-described process of limiting the braking-torque control amount using the limit value. A square-processing unit 3342a squares the pitch rate signal to thereby invert its sign and to smooth the rise of the control force. A pitch-rate square damping moment calculation unit 3342b calculates a pitch moment Mp by multiplying the squared pitch rate by a skyhook gain CskyP in the pitch term, in which the square processing is taken into account. A target deceleration calculation unit 3342c calculates a target deceleration by dividing the pitch moment Mp by the mass m and the height Hcg of the vehicle center of gravity from the road surface.

A jerk threshold limiting unit 3342d determines whether or not the rate of change of the calculated target deceleration, i.e. a jerk, does not exceed a preset deceleration jerk threshold and a preset acceleration jerk threshold, and whether or not the target deceleration is within limit values for the longitudinal acceleration. If the rate of change exceeds any one of the thresholds, the target deceleration is corrected to a value not exceeding the jerk thresholds. If the target deceleration exceeds the limit value, it is set within the limit values. Thus, generation of a deceleration may be generated without causing the driver to feel discomfort.

A target pitch moment converting unit 3343 calculates a target pitch moment by multiplying the target deceleration degree limited by the jerk threshold limiting unit 3342d by the mass m and the height Hcg, and outputs the target pitch moment to the brake controller 202.

[Frequency-Sensitivity Control Unit] Now, a frequency-sensitivity control process performed by the sprung-mass vibration suppression or damping control unit is described. In the Embodiment 1, the sprung-mass damping control is accomplished by performing the skyhook control based on sprung-mass speeds estimated basically from detection values obtained by the stroke sensors 14. However, there is such case that adequate estimation accuracy cannot be obtained using the wheel speed sensor 5. Further, a case arises in which, depending on a traveling state or the intension of the driver, a comfortable running state (giving priority to a smooth ride rather than a flat feel of the vehicle body) is desired. In such cases, in a vector control, such as the skyhook control, a slight phase offset makes it hard for the control to be performed properly because the relation between the signs of the stroke speed and the sprung mass speed (such as a phase) is important. For this reason, a frequency-sensitive control is adopted, which is a sprung mass vibration suppression control performed according to a scalar quantity of vibration characteristics.

Figure 9:
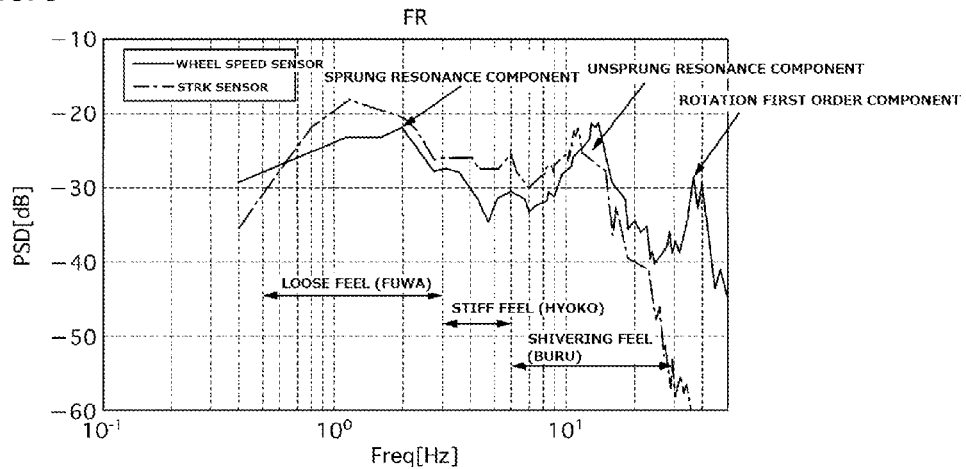
FIG. 9 is a diagram illustrating a wheel speed frequency characteristic detected by a wheel speed sensor compared to a stroke frequency characteristic of a stroke sensor not installed in the embodiment.

FIG. 9 is a graph showing a wheel speed frequency characteristic detected by a wheel speed sensor and a stroke frequency characteristic by a stroke sensor not installed in the embodiment for comparison. In the frequency characteristic, the magnitude of the amplitude with respect to frequency is taken as a scalar quantity and presented in a vertical axis. When comparing the frequency component of the wheel speed sensor 5 with the frequency component of the stroke sensor, it will be appreciated that substantially similar amount of scalar is exhibited across the sprung resonance frequency and the unsprung resonance frequency. Thus, out of the detection values of the wheel speed sensor 5, the damping force will be set based on this frequency characteristic. Here, the frequency range in which the sprung resonance frequency component exists is referred to as a frequency range of a loose feel region or FUWA region or range (0.5 Hz to 3 Hz) where the occupant experiences such a feel that the entire human body oscillates as if being thrown into the air so that the gravitational acceleration exerted on the occupant would be felt reduced. The region or range between the sprung resonance frequency and the unsprung resonance frequency is referred to as a stiff feel region or HYOKO region (3 Hz to 6 Hz) where the occupant is, though not given of the feel of the gravitational acceleration being decreased, but is given with such a feel as if he or she jumps up and down like on a trotting horse, or in other words, such a feel that the entire body follows to move up and down in a continuous manner. The region in which the unsprung resonance frequency exists is referred to as a shivering feeling region or BURU region (6 to 23 Hz) where a small shaking is transmitted to a part of the human body such as thighs, though not to the extent at which the mass of human body follows to vertically oscillate.

Figure 10:
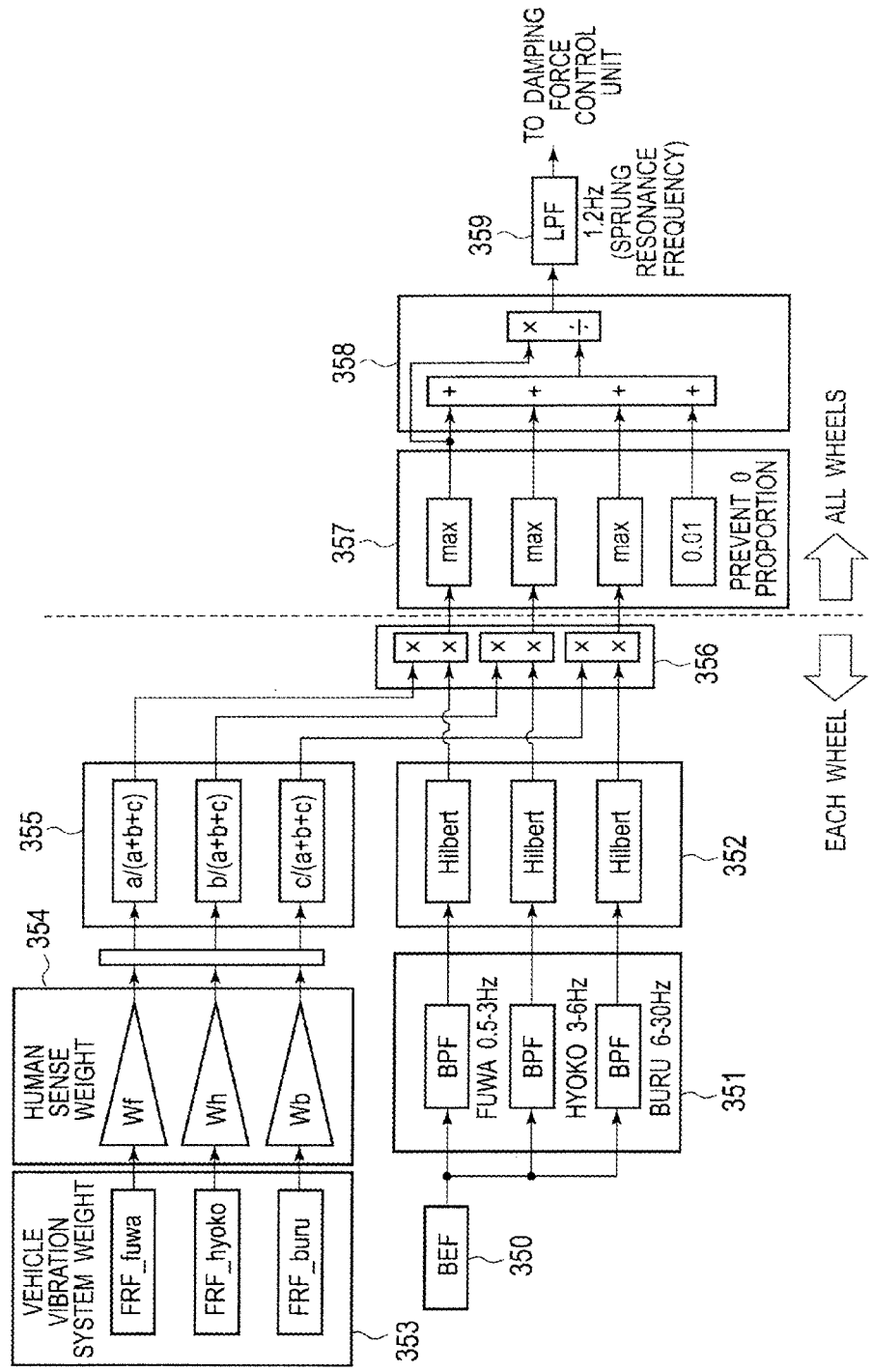
FIG. 10 is a control block diagram illustrating a frequency sensitive control in sprung-mass vibration suppression or damping control in the first embodiment.

FIG. 10 is a control block diagram illustrating the frequency sensitive control in the sprung mass vibration suppression control in the first embodiment. A band elimination filter 350 eliminates noise other than the vibration component for use in the present control with respect to each wheel speed sensor value. A predetermined frequency region division unit 351 divides the vibration component into respective regions of the loose feel region, the stiff feel region, and the shivering feeling region. A Hilbert transform processing unit 352 performs Hilbert transform on each of the divided frequency bands to transform them into scalar quantities which are determined based on the amplitudes of the frequencies (specifically the area calculated by the amplitude and the frequency band).

A vehicle vibration weighting unit 353 sets the weights of each of frequency bands corresponding to the loose feel region, the stiff feel region, and the shivering feeling region, by which the vibrations of respective frequency bands are actually transmitted to the vehicle body. A human-sense weighting unit 354 sets the weights of each of frequency bands corresponding to the loose feel region, the stiff feel region, and the shivering feeling region, by which the vibrations of respective frequency bands are actually transmitted to the occupant.

Figure 11:
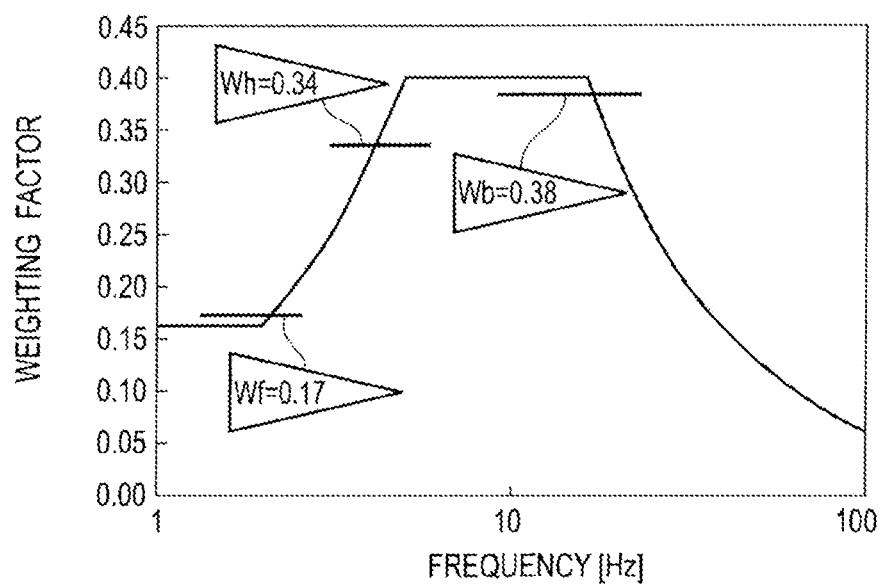
FIG. 11 is a correlation diagram illustrating human sense characteristics in each of frequency regions.

A description is now given of the human-sense weighting. FIG. 11 is a correlation chart illustrating characteristics of human sense with respect to frequency. As shown in FIG. 11, the sensitivity of the occupant with respect to frequency is relatively low in the loose feel region, i.e. in the low-frequency region, and the sensitivity gradually increases toward the high-frequency region. Vibrations are less likely to be transmitted to the occupant in the high-frequency region beyond the shivering feeling region. Considering this situation, the human-sense weight Wf in the loose feel region is set to 0.17, the human-sense weight Wh in the stiff region second region is set to 0.34 which is greater than Wf, and the human-sense weight Wb in the shivering feeling region is set to 0.38 which is greater than Wf and Wh. Thus, the correlation between the scalar quantity of each of the frequency bands and vibrations actually transmitted to the occupant can be further improved. Note that these two weight coefficients may be changed appropriately according to the concept of the vehicle or the preference of the driver.

A weight determining unit 355 calculates a ratio of each of the weights of the respective frequency bands to all the weights. When "a" denotes the weight for the loose feel region, "b" the weight for the stiff feel region, and "c" the weight for the shivering feeling region, the weight coefficient for the loose feel region is expressed by (a/(a+b+c)), the one for the stiff feel region is expressed by (b/(a+b+c)), and the one for the shivering feeling region is expressed by (c/(a+b+c)), respectively.

A scalar quantity calculation unit 356 obtains final scalar quantities by respectively multiplying the scalar quantities of the frequency bands calculated by the Hilbert transform processing unit 352 by the weights calculated by the weight determining unit 355, and outputs the final scalar quantities. The process thus far is performed on each of the wheel speed sensor values of the respective wheels.

A maximum-value selecting unit 357 selects the maximum value out of the final scalar quantities calculated for the respective four wheels. Note that 0.1 at the bottom is set so that, when the total of the maximum values is assigned to a denominator in a later process, the denominator may not be set to be 0, "zero". A ratio calculation unit 358 calculates a ratio, by assigning the total of the maximum scalar quantity values of the respective frequency bands to the denominator and assigning the maximum scalar quantity value of the frequency band corresponding to the loose feel region to the numerator. In other words, the ratio calculation unit 358 calculates the ratio of the loose feel region contained in the total of the vibration components. A sprung-mass resonance filter 359 performs a filtering process of about a sprung-mass resonance frequency of 1.2 Hz on the calculated ratio to extract the sprung-mass resonance frequency component corresponding to the loose feel region based on the calculated ratio. This is because, since the loose feel region exists around 1.2 Hz, it can be considered that the ratio of the loose feel region changes around 1.2 Hz, too. Then, the final extracted ratio is outputted to a damping-force control unit 35, which outputs a frequency-sensitive damping force control amount according to that ratio.

Figure 12:
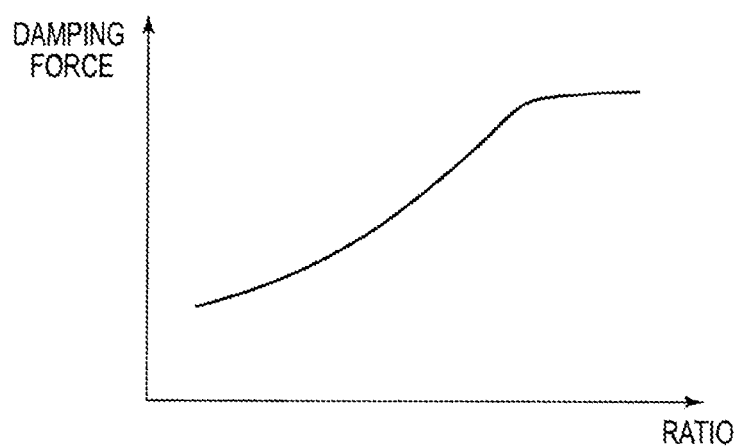
FIG. 12 is a characteristics diagram showing the relation between the inclusion ratio of the loose feel region vibration and a damping force obtained by the frequency-sensitive control of the first embodiment.

FIG. 12 is a characteristics chart showing the relation between the inclusion ratio of the loose feel region vibrations and a damping force obtained by the frequency-sensitive control of the first embodiment. As shown in FIG. 12, a vibration level of the sprung-mass resonance is decreased by setting the damping force high where the ratio of the loose feel region is large. Even when the damping force is set high, high-frequency vibrations and vibrations that follow to jump up will not be transmitted to the occupant since the stiff feel region and the shivering feeling region occupy small rates. On the other hand, by setting the damping force low when the ratio of the loose feel region is small, the vibration transmission characteristic equal to or above the sprung-mass resonance decreases to thereby suppress the high frequency vibrations, which contributes to a smooth and comfortable ride.

Figure 13:
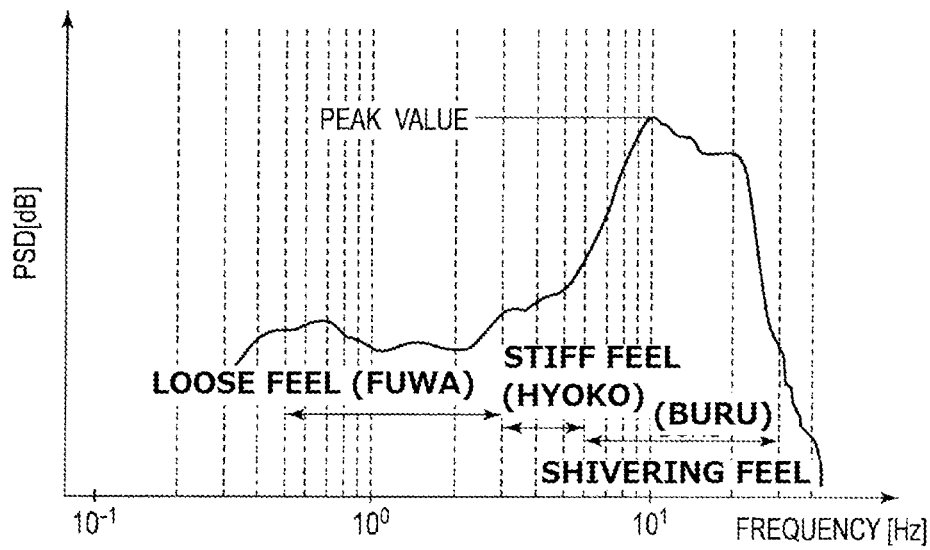
FIG. 13 is a diagram illustrating a wheel speed frequency characteristic detected by a wheel speed sensor in a given travelling state.

Now, a description is given of the advantages of the frequency-sensitive control as compared to the skyhook control. FIG. 13 shows a diagram illustrating the frequency characteristic of a wheel speed detected by the wheel speed sensor 5 under certain traveling states. This characteristic would be obtained if the vehicle runs on, for example, a stone-paved road having successive small recesses and bumps. When the skyhook control is performed on a vehicle running on a road surface having such characteristic, the skyhook control determines the damping force based on the value of peak amplitude. Consequently, if phase estimation is deteriorated with respect to input of high-frequency vibrations, a very high damping force is set in a false timing so that the high-frequency vibration characteristic will be deteriorated.

In contrast, the frequency-sensitive control, which uses not vectors but scalar quantities, sets a small damping force for such a road surface as shown in FIG. 13 since the ratio of the loose feel region is small. Thus, even when the amplitude of vibrations in the shivering feeling region is large, the vibration transmission characteristic decreases sufficiently to avoid lowering the high-frequency vibration characteristics. For this reason, the high-frequency vibrations can be suppressed by the frequency-sensitive control, which uses scalar quantities, in a region where control by the skyhook control using expensive sensors is difficult due to deterioration in the phase estimation accuracy.

(S/A-Side Driver-Input Control Unit) Now, the S/A-side driver-input control unit is described. The S/A-side driver-input control unit 31 calculates a driver-input damping force control amount for attaining a vehicle behavior that the driver wished to accomplish based on signals from the steering angle sensor 7 and the vehicle speed sensor 8, and outputs the driver-input damping force control amount to the damping force control unit 35. For example, when the driver makes a turn, the nose of the vehicle is lifted, which is likely to deflect the field of vision of the driver from the road surface? In this case, to prevent such nose lifting, the damping forces for the four wheels are outputted as the driver-input damping force control amounts. Further, the S/A-side driver-input control unit 31 also outputs the driver-input damping force control amounts for suppressing the roll motion caused during the turn.

Figure 14:
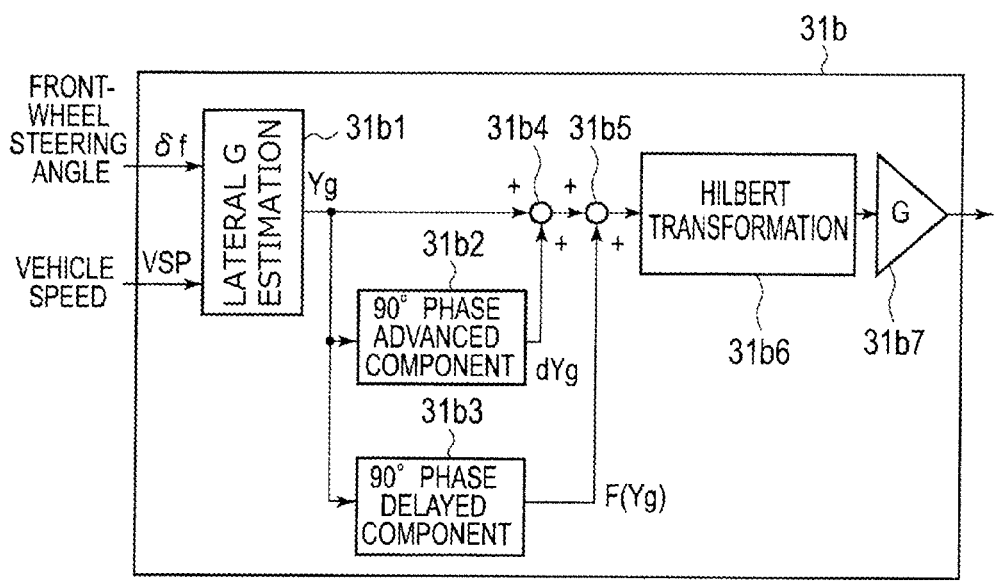
FIG. 14 is a control block diagram illustrating the configuration of roll rate suppression control in the first embodiment.

(Roll Control by the S/A-Side Driver-Input Control Unit) A description is now given of a roll suppression control performed by the S/A-side driver-input control unit. FIG. 14 is a control block diagram illustrating the configuration of roll-rate suppression control in the first embodiment. A lateral acceleration estimation unit 31b1 estimates a lateral acceleration Yg based on a front-wheel steering angle δf detected by the steering angle sensor 7 and a vehicle speed VSP detected by the vehicle speed sensor 8. The lateral acceleration Yg is calculated by the equation below based on a vehicle plan view model, wherein "A" is a predetermined value.

$Yg=(VSP^2/(1+A \cdot VSP^2)) \cdot \delta f$

A 90° phase advanced component creating unit 31b2 differentiates the estimated lateral acceleration Yg, and outputs a differentiated lateral acceleration dYg. A first adding unit 31b4 adds the lateral acceleration Yg and the differentiated lateral acceleration dYg together. A 90° phase delayed component creating unit 31b3 outputs a component F (Yg) obtained by delaying the phase of the estimated lateral acceleration Yg by 90°. A second adding unit 31b5 adds the value obtained by the first adding unit 31b4 to the component F (Yg). A Hilbert transformation unit 31b6 calculates a scalar quantity based on an envelope waveform of the added value. A gain multiplying unit 31b7 multiplies the scalar quantity which is obtained based on the envelope waveform by the gain to calculate a driver-input attitude control amount used for the roll-rate suppression control, and outputs the control amount to the damping-force control unit 35.

Figure 15:
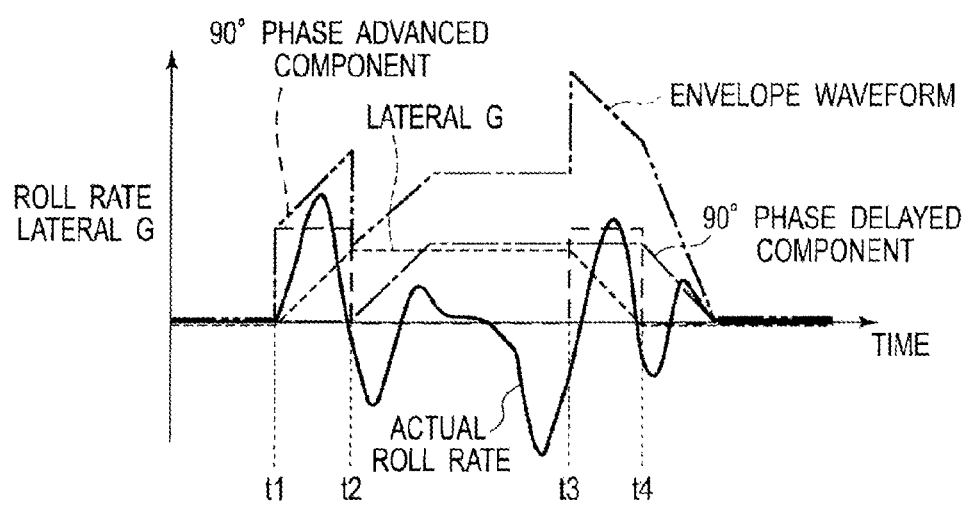
FIG. 15 is a time chart illustrating an envelope-waveform formation process in the roll rate suppression control in the first embodiment.

FIG. 15 is a time chart illustrating an envelope-waveform formation process in the roll-rate suppression control in the first embodiment. Once the driver has started steering at the Time t1, the roll rate starts to be generated gradually. At this time, the generation of the roll rate at the initial stage of the steering can be suppressed by a driver-input attitude control amount calculated from a scalar quantity which is based on an envelope waveform formed by addition of a 90° phase advanced component. Next, when the driver stops steering at Time t2, the phase delay component F (Yg) is added instead of the 90° phase advance component. In this steady steering state, even when the roll rate does not change much, a roll-rate resonance component is generated, which corresponds to a swing-back of the roll rate. If the phase delay component F(Yg) had not been added, a small damping force would be set for a period between Time t2 and Time t3, which might make the vehicle behavior unsteady due to the roll-rate resonance component. The 90° phase delayed component F (Yg) is added in order to suppress this roll-rate resonance component.

When the driver turns the steering wheel from the steering-stop position back to the neutral position to run straight at time t3, the lateral acceleration Yg decreases. Also, the roll rate is decreased to a small value. The damping force is surely secured by the action of the 90° phase delay component F (Yg). Therefore an unsteady vehicle behavior due to the roll-rate resonance component may be avoided to occur.

(Unsprung-Mass Vibration Suppression Control Unit) Now, the configuration of the unsprung mass vibration suppression control unit is described. As described above as to the conventional vehicle in FIG. 7A, a tire has an elastic coefficient and a damping coefficient, as well. Therefore a resonance frequency band also exists. However, since the tire has a smaller mass and a greater elastic coefficient than the sprung mass, the unsprung-mass resonance component exists at a higher frequency than the sprung-mass resonance component. This unsprung-mass resonance component shakes the tire at the unsprung-mass side, which might lead to a poor road-hugging performance. Further, the shaky motion at the unsprung-mass side might cause discomfort to the occupant. A damping force according to the unsprung-mass resonance component is set to suppress the shaking of the tire due to the unsprung-mass resonance.

Figure 16:
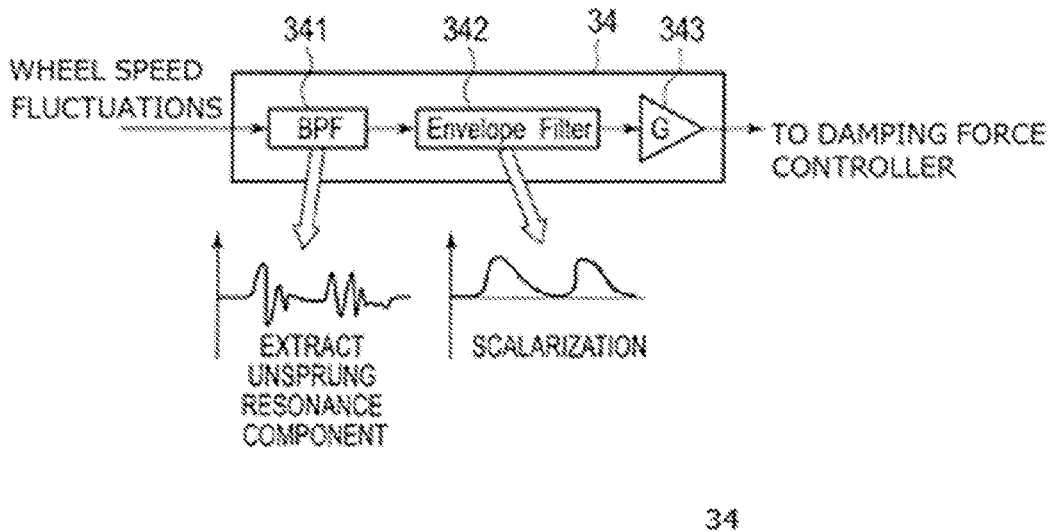
FIG. 16 is a block diagram illustrating a control configuration of unsprung vibration suppression control or damping control of the first embodiment.

FIG. 16 is a block diagram illustrating the control configuration of the unsprung-mass vibration suppression or damping control in the first embodiment. An unsprung-mass resonance component extracting unit 341 extracts an unsprung-mass resonance component by applying bandpass-filtering on the wheel speed fluctuations outputted from the deviation calculation unit 321b in the travelling state estimation unit 32. The unsprung-mass resonance component is extracted from a region between about 10 Hz to 20 Hz of the wheel speed frequency component. An envelope waveform shaping unit 342 obtains a scalar value of the extracted unsprung-mass resonance component, and shapes an envelope of the waveform by using an envelope filter. A gain multiplying unit 343 multiplies the scalar unsprung-mass resonance component by the gain to calculate an unsprung-mass vibration suppression damping force control amount, and outputs it to the damping force controller 35. In the first embodiment, the unsprung-mass resonance component is extracted through bandpass-filtering of the wheel speed fluctuations outputted from a deviation calculation unit 321b of the traveling-state estimating unit 32. Instead, the traveling-state estimating unit 32 may extract the unsprung-mass speed by applying the bandpass-filtering on the detected wheel speed sensor. Alternatively, the unsprung resonance component may be extracted by the unsprung speed along with the sprung mass speed in the running or travelling state estimation unit.

Figure 17:
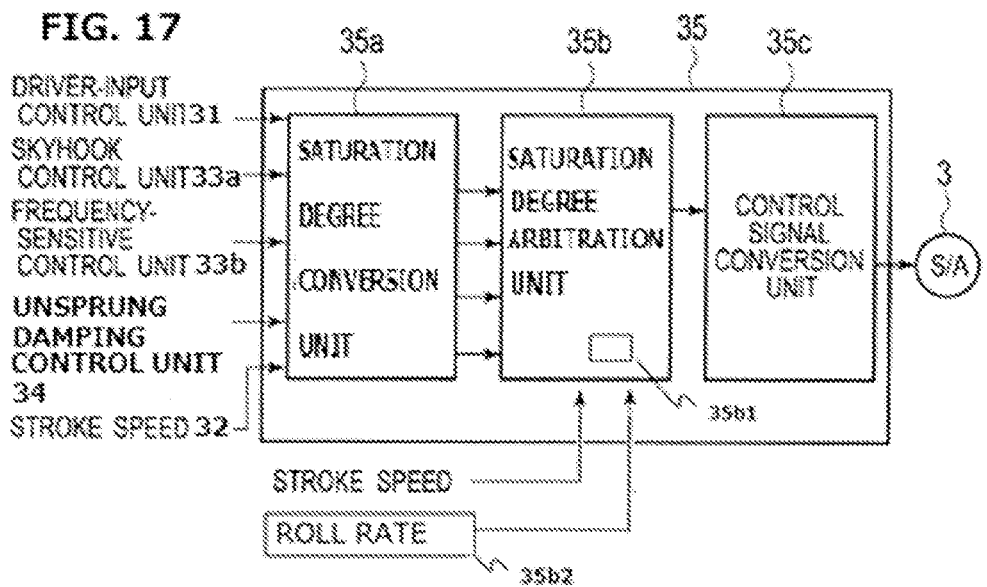
FIG. 17 is a control block diagram illustrating the control configuration of a damping-force control unit in the first embodiment.

(Configuration of the Damping Force Controller) Now, the configuration of the damping-force control unit 35 is described. FIG. 17 is a control block diagram illustrating the control configuration of the damping force control unit 35 in the first embodiment. A saturation degree conversion unit 35a receives the driver-input damping force control amount from the driver-input control unit 31, the S/A attitude control amount outputted from the skyhook control unit 33a, the frequency sensitive damping force control amount outputted from the frequency sensitive control unit 33b, the unsprung-mass vibration suppression damping force control amount outputted from the unsprung-mass damping control unit 34, and the stroke speed calculated by the traveling-state estimating unit 32, and converts these amounts into equivalent viscous damping coefficients. Then, based on the stroke speed, the equivalent viscous damping coefficient Ce, and the maximum value Cemax and the minimum value Cemin of the damping coefficient at this stroke speed, the saturation degree DDS (%) is calculated by the following equation:

$$DDS=((Ce-Cemin)/(Cemax-Cemin))\times 100$$

Figure 18:
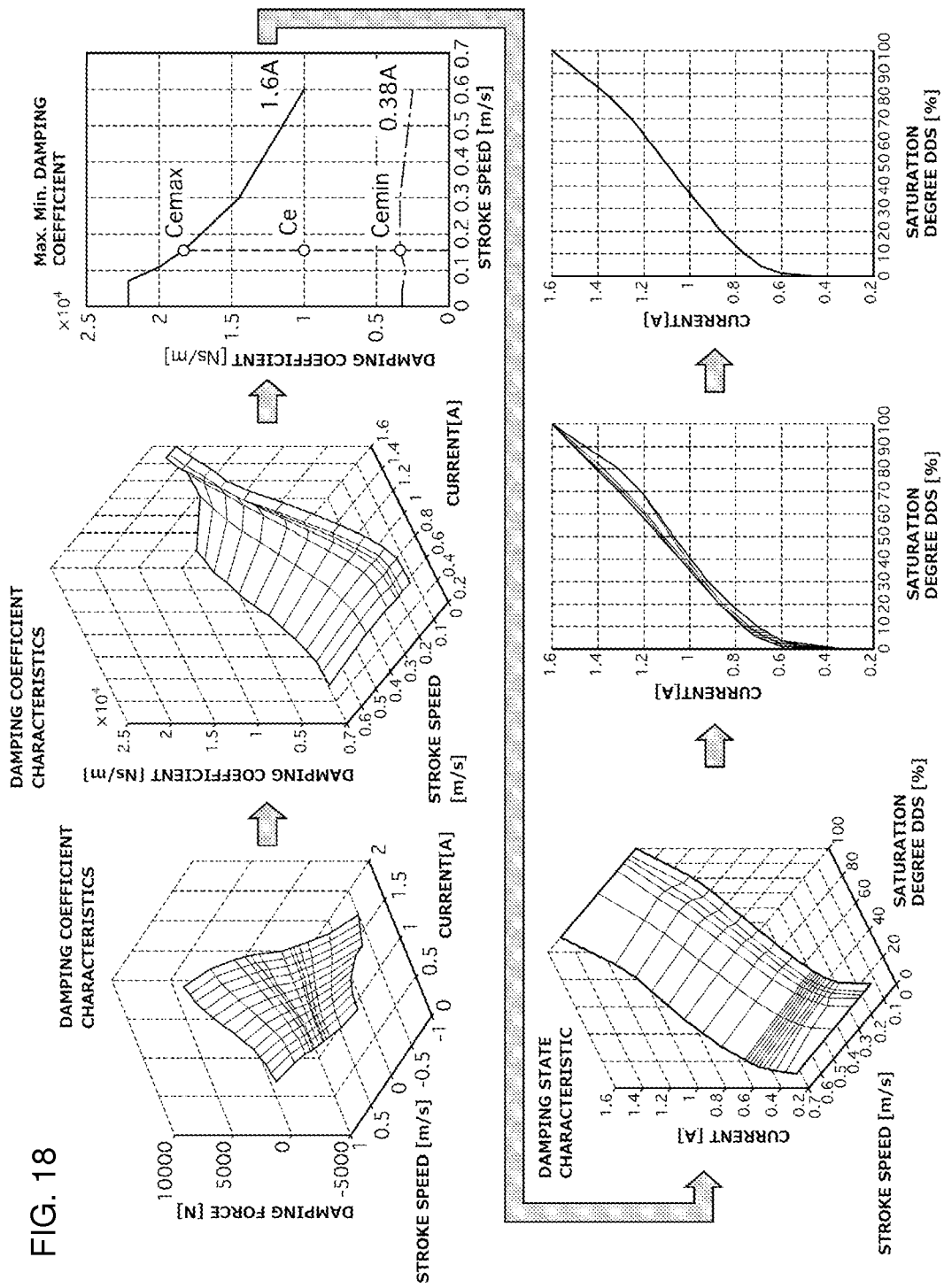
FIG. 18 is a diagram illustrating a relationship between the saturation degree and a command current value to S/A3 in the first embodiment.

The reason for introduction of the saturation degree is now described. FIG. 18 is a diagram showing a relationship between the saturation degree and the command current to the S/A 3 in the first embodiment. The damping force characteristic shown at the top left of FIG. 18 represents the damping force with respect to the stroke speed, and, when converted into the damping coefficient characteristics, the characteristics shown in the upper center is available. Since the damping coefficient depends on the stroke speed, in order to improve the accuracy in determining the current value, an extremely large amount of data has to be accumulated in a storing region, so that, depending on the amount of data, it is difficult to ensure sufficient accuracy.

Here, it is assumed that the required equivalent viscous damping coefficient Ce is to be expressed using the damping coefficient maximum value Cemax and the damping coefficient minimum value Cemin at each stroke speed. Then, this may be represented as a saturation degree characteristic as shown in the bottom left of FIG. 18. When the saturation degree characteristic is viewed with the saturation degree DDS set as the horizontal axis along the axis of the stroke speed direction, it will be appreciated that the command currents corresponding to each saturation degree are distributed in a very narrow range. Thus, the relationship between the saturation degree and the command current exists, which does not depend on the stroke speed. Therefore, by taking the average of the command current values with respect to the stroke speed direction and using this average command current value, a relationship between the saturation degree and the current characteristic shown in the bottom right of FIG. 18 may be obtained. Because of the reasons stated above, in the first embodiment, after the damping coefficient has been calculated and converted into the saturation degree, the improvement in the control accuracy will be achieved.

A damping coefficient arbitrator 35b arbitrates as to, based on which of the saturation degrees converted in the saturation degree conversion unit 35a (hereinafter respective saturation degrees will be referred to as a driver-input saturation degree k1, an S/A attitude saturation degree k2, a frequency-sensitive saturation degree k3, and an unsprung-mass vibration suppression saturation degree k4, respectively) control is performed. The arbitrated saturation degree is limited by a saturation degree limiting map previously prepared based on the stroke speed to output the limited saturation degree as a final saturation degree. A control signal conversion unit 35c converts the saturation degree into the corresponding final control signal (command current value) to be outputted to the S/A 3.

[Saturation Degree Arbitration Unit] Now, a description is given of arbitration process performed by the saturation degree arbitration unit 35b. The vehicle control system or device in the first embodiment has four control modes, i.e. Standard mode, Sports mode, Comfort mode, and Highway mode. Standard mode assumes that the vehicle drives in an urban area and makes modest turns; Sports mode assumes that the vehicle drives actively on winding roads and the like and makes stable turns; Comfort mode assumes that the quality of ride is prioritized such as at the time of start of the vehicle at low speed; Highway mode assumes that the vehicle runs at high speed on highways and the like with many straight tracks.

In Standard mode, while the skyhook control is being performed by the skyhook control unit 33a, the priority is given to the control of the unsprung-mass vibration suppression or damping control by the unsprung-mass damping control unit 34.

In Sports mode, while the driver-input control by the driver-input control unit 31 is prioritized, the skyhook control by the skyhook control unit 33a and the unsprung-mass damping control by the unsprung-mass damping control unit 34 are executed.

In Comfort mode, the unsprung-mass damping control by the unsprung-mass damping control unit 34 is prioritized, while the frequency sensitive control by the frequency sensitive control unit 33b is being performed.

In Highway mode, while the driver-input control by the driver-input control unit 31 is prioritized, control in which a control amount obtained by the unsprung-mass damping control performed by the unsprung-mass damping control unit 34 is added to a control amount obtained by the skyhook control performed by the skyhook control unit 33a is also performed. Arbitration of the saturation degrees in each of these modes is described below.

Figure 19:
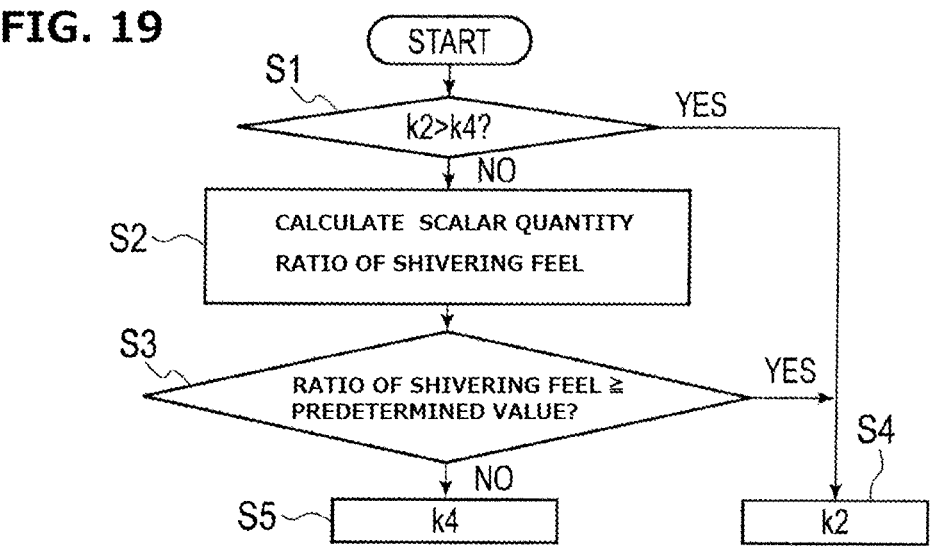
FIG. 19 is a flowchart showing a damping coefficient arbitration process in a Standard mode in the first embodiment.

(Arbitration in Standard Mode) FIG. 19 is a flowchart showing the saturation degree arbitration process performed in Standard mode in the first embodiment. In Step S1, a determination is made whether or not the S/A attitude saturation degree coefficient k2 is greater than the unsprung mass damping coefficient k4. When k2 is greater than k4, process proceeds to Step S4 to set k2 as the saturation degree.

In Step S2, the ratio of the scalar quantity of the shivering feeling region is calculated based on the scalar quantities of the respective loose feel region, stiff feel region, and the shivering feeling region described above regarding the frequency sensitive control unit 33b.

In Step S3, a determination is made whether or not the ratio of the shivering feeling region is at or above a predetermined value. When the ratio is at or above the predetermined value, the process proceeds to step S4 to set k2, which is the lower value, as the saturation degree, because there is a concern that a high frequency vibration might deteriorate the riding comfort. When, on the other hand, the ratio of the shivering feeling region is below the predetermined value, the process proceeds to step S5 to set k4 as the saturation degree, because there is little concern that a high saturation degree would lower the riding quality due to high frequency vibrations.

As described above, in Standard mode, the unsprung-mass vibration suppression control which suppresses the unsprung-mass resonance is generally prioritized. However, when a damping force required by the skyhook control is equal to or below the damping force required by the unsprung-mass vibration suppression control, and then when the ratio of the shivering feeling region is large, the damping force by the skyhook control is set so as to prevent lowering of the high-frequency vibration characteristics, which is caused by satisfying the requirements from the unsprung vibration suppression control. Thus, an optimum damping characteristic can be obtained according to the traveling states, the lowering of the ride quality due to high-frequency vibrations can be avoided, while allowing the driver to feel that the vehicle body is level.

Figure 20:
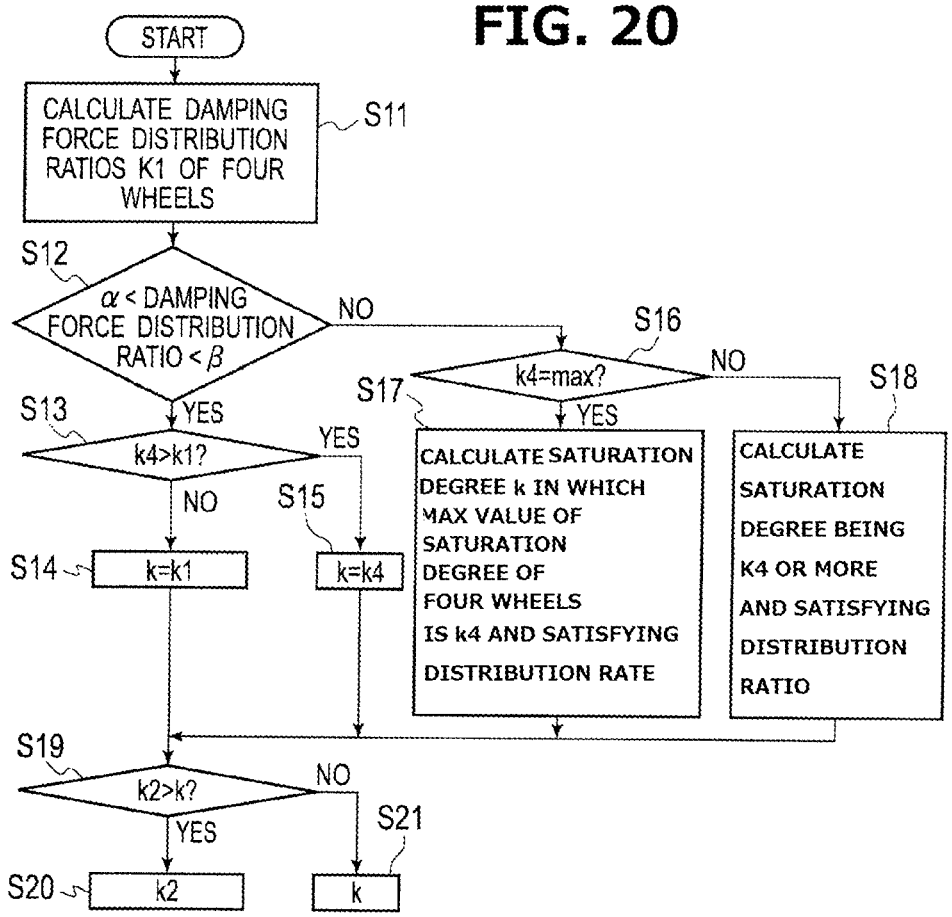
FIG. 20 is a flowchart showing a damping coefficient arbitration process in a Sports mode in the first embodiment.

(Arbitration in Sports Mode) FIG. 20 is a flowchart showing damping coefficient arbitration process performed in Sports mode in the first embodiment. In Step S11, damping force distribution ratios are calculated for the respective four wheels based on the driver-input saturation degree k1 of each of the four wheels set by the driver-input control. The damping force distribution ratios xfr, xfl, xrr, and xrl of the respective wheels are calculated as follows, when the driver-input saturation degree for the front right wheel is denoted by k1fr, that for the front left wheel is denoted by k1fl, that for the rear right wheel is denoted by k1rr, and that for the rear left wheel is denoted by k1rl, respectively;

$$xfr = k1fr/(k1fr+k1fl+k1rr+k1rl)$$

$$xfl = k1fl/(k1fr+k1fl+k1rr+k1rl)$$

$$xrr = k1rr/(k1fr+k1fl+k1rr+k1rl)$$

$$xrl = k1rl/(k1fr+k1fl+k1rr+k1rl)$$

In step S12, a determination is made whether or not the damping force distribution ratios x are within a predetermined range (greater than α and smaller than β). When all the ratios x are within the predetermined range, it is judged that the distribution is about equal among the wheels, and control proceeds to step S13. When any one of the ratios x is found to be out of the predetermined range, control proceeds to step S16.

In step S13, a determination is made whether or not the unsprung-mass vibration suppression damping coefficient k4 is greater than the driver-input damping coefficient k1. When k4 is greater than k1, control proceeds to step S15 to set k4 as a first saturation degree k. When, on the other hand, k4 is equal to or smaller than k1, control proceeds to step S14 to set k1 as the first saturation degree k.

In step S16, a determination is made whether or not the unsprung-mass vibration suppression or damping saturation degree k4 is a maximum value (max) settable by the S/A 3. Control proceeds to step S17 when k4 is the maximum value (max), and if not, control proceeds to step S18.

In step 17, a calculation is made in which the maximum value of the driver-input saturation degree k1 of the four wheels is the unsprung damping coefficient k4 and the saturation degree satisfying the damping force distribution rate is set to the first saturation degree k. In other words, a saturation degree which is the greatest but is still within the predetermined damping force distribution ratio range is calculated.

In step S18, a saturation degree at which all the driver-input damping coefficients k1 of the four wheels are greater than k4 and which still satisfies the damping-force distribution ratio is calculated as the first saturation degree k. In other words, a value which meets the damping force distribution ratio set by the driver-input control, and which further satisfies the request by the unsprung-mass damping control is calculated.

In step S19, a determination is made whether or not the first saturation degree k set by in each step above is smaller than the S/A attitude saturation degree k2 set by the skyhook control. When k is determined to be smaller than k2, which means that the saturation degree required by the skyhook control is greater, control proceeds to step S20 to set k2 as the final saturation degree. When k is equal to or greater than k2, control proceeds to step S21 to set k as the final saturation degree.

As described above, in Sports mode, the unsprung-mass vibration suppression control which suppresses unsprung-mass resonance is prioritized in principle. However, since the damping-force distribution ratio required by the driver-input control is closely related to the attitude of the vehicle body, and is in close relationship with change in the driver's field of vision in particular, the top priority is given to securing the damping force distribution ratio rather than the saturation degree itself which has been required by the driver input control side. Further, in order to change the attitude of the vehicle body while securing the damping force distribution ratio, the skyhook control is selected by "select-high" so that stable attitude of the vehicle body will be ensured.

Figure 21:
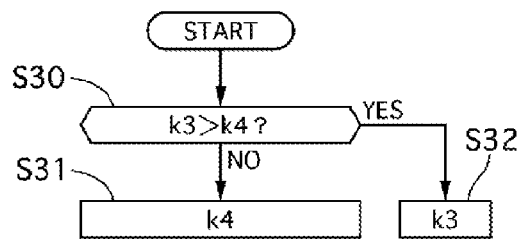
FIG. 21 is a flowchart showing damping coefficient arbitration process in a Comfort mode in the first embodiment.

(Arbitration in Comfort Mode) FIG. 21 is a flowchart showing the saturation degree arbitration process performed in Comfort mode in the first embodiment. In step S30, a determination is made whether or not the frequency-sensitive saturation degree k3 is greater than the unsprung-mass damping saturation degree k4. When k4 is greater than k3, control proceeds to step S32 to set the frequency-sensitive saturation degree k3. When, on the other hand, k3 is equal to or smaller than k4, control proceeds to step S32 to set the unsprung-mass saturation degree k4.

As described, in Comfort mode, the unsprung-mass vibration suppression control which suppresses unsprung-mass resonance is generally prioritized. Since the frequency-sensitive control is performed originally as the sprung mass vibration suppression control to thereby set an optimum saturation degree in accordance with road conditions, the control is achieved that can secure a riding comfort while avoiding an insufficient ground contact feeling due to the fluttering of the unsprung member or mass by the unsprung damping control. Note that, in Comfort mode, as in Standard mode, the damping coefficient may be switched according to the ratio of the frequency scalar quantity in the shivering feeling region. Thus, Super-comfort mode with an even better riding comfort may be provided.

Figure 22:
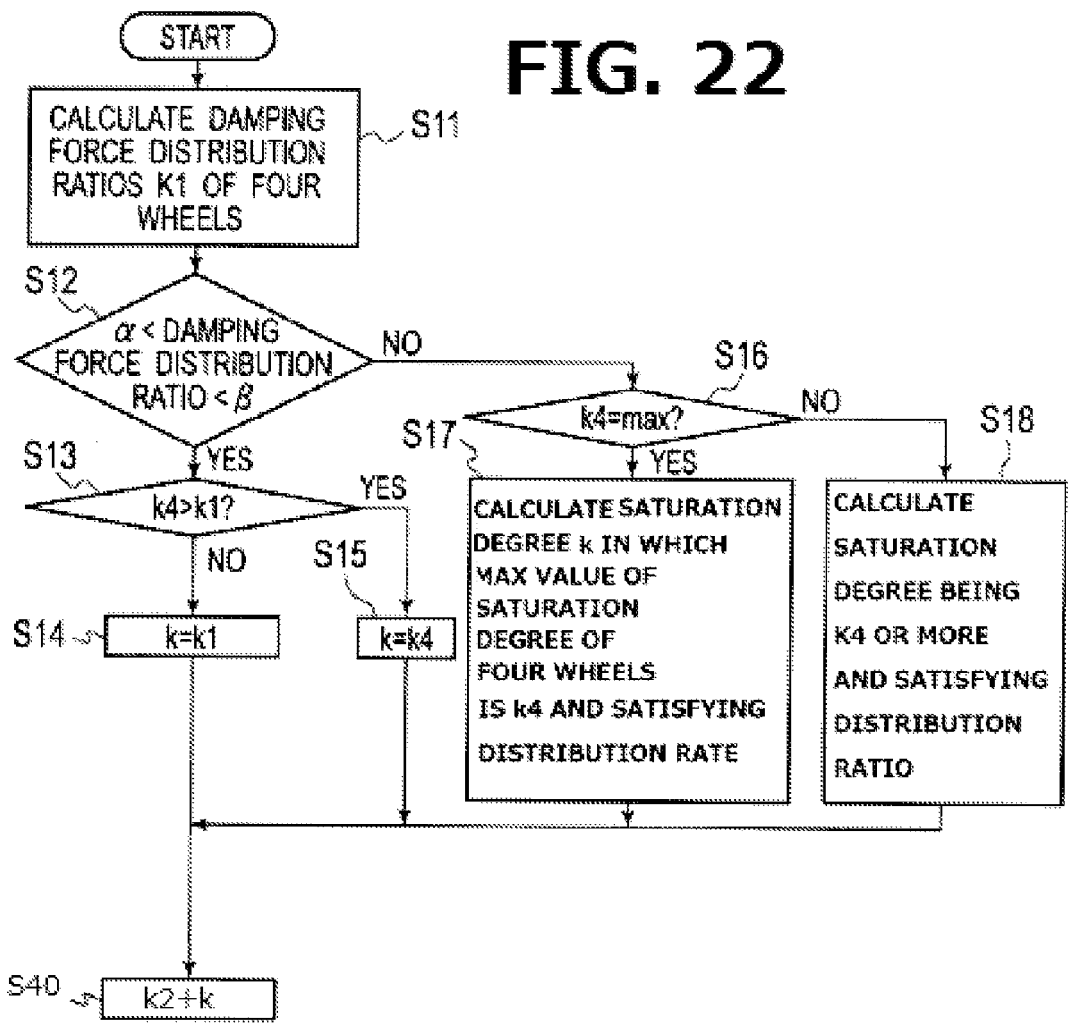
FIG. 22 is a flowchart showing a damping coefficient arbitration process in a Highway mode in the first embodiment.

(Arbitration in Highway Mode) FIG. 22 is a flowchart showing the saturation degree arbitration process performed in Highway mode in the first embodiment. The process from steps S11 to S18 is the same as that of the arbitration in Sports mode, and the description is therefore omitted. In step S40, the S/A attitude saturation degree k2 set by the skyhook control is added to the first saturation degree k obtained by the arbitration process performed up to step S18, and a value thus obtained is outputted.

Figure 23:
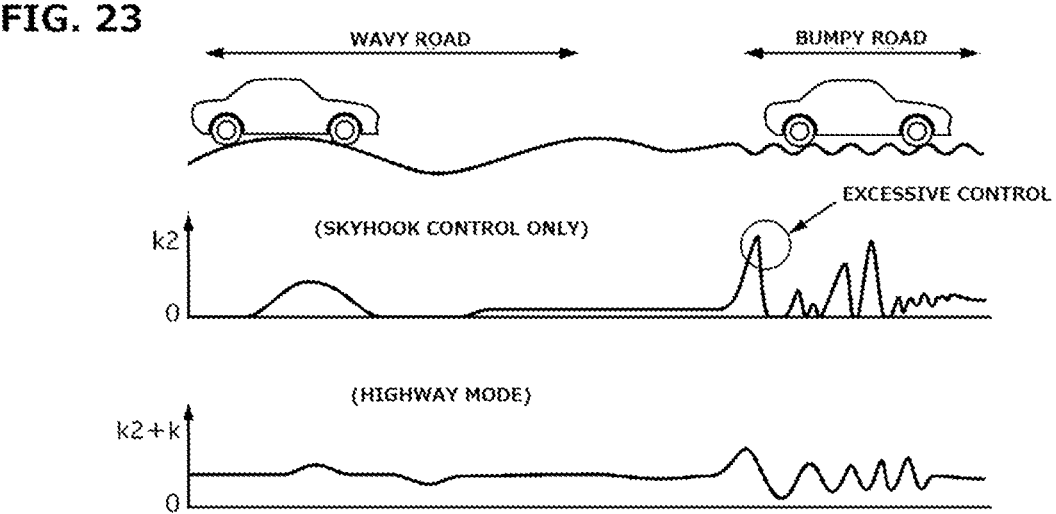
FIG. 23 is a time chart showing change in the damping coefficient of a vehicle running on a wavy road and a bumpy road.

As described above, in Highway mode, arbitration of the saturation degree is performed using the value obtained by adding the S/A attitude saturation degree k2 to the arbitrated first saturation degree k. The operation is now described with reference to a figure. FIG. 23 is a time chart showing a change in the saturation degree for a vehicle running on a wavy road and a bumpy road. For example, suppose that a vehicle experiences a relatively low frequency motion of a vehicle body by running on a wavy highway. If only the skyhook control is used to suppress such motion, there is a need to detect a minute change in the wheel speed. Therefore, the gain of the skyhook control needs to be set very high. In this case, a motion of relatively low frequency can be suppressed, but if the vehicle runs on a bumpy road, the large control gain might lead to excessive damping-force control. This brings about concerns about lowering the riding comfort and/or the deterioration in the attitude of vehicle body.

In contrast, since the first saturation degree k is constantly set in Highway mode, a certain level of damping force is always secured. Thus, even when the saturation degree by the skyhook control is small, the relatively low frequency motion of the vehicle body can be suppressed. In addition, since there is no need for the gain of the skyhook control to be raised high, a bumpy road may be coped with as well with a normal control gain. Moreover, since the skyhook control is performed with the first saturation degree k being set, unlike the saturation degree limitation, operation for a step of decreasing the saturation degree is possible in a semi-active control region to thereby allow a stable vehicle attitude during a high-speed travel.

Figure 24:
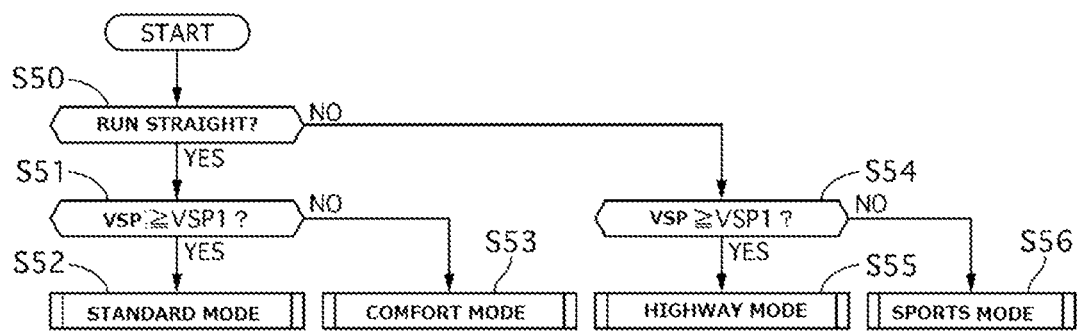
FIG. 24 is a flowchart showing a mode selection process performed by a damping coefficient arbitrator in the first embodiment based on traveling states.

(Mode Selection Processing) Now, a description is given of a mode selection process for selecting the running modes described above. FIG. 24 is a flowchart showing the mode selection process in the first embodiment performed by the saturation degree arbitration unit 35b based on traveling states.

In step S50, a determination is made based on a value from the steering angle sensor 7 whether or not the vehicle is running straight. Control proceeds to step S51 if the vehicle is running straight, and to step S54 if the vehicle is turning.

In step S51, a determination is made based on a value from the vehicle speed sensor 8 whether or not the value is equal to or greater than a predetermined vehicle speed VSP1 which indicates a high speed running state. If the sensor value is equal to or greater than VSP1, control proceeds to step S52 to select Standard mode. If the sensor value is smaller than VSP1, control proceeds to step S53 to select Comfort mode.

In step S54, a determination is made based on a value from the vehicle speed sensor 8 whether or not the value is equal to or greater than the predetermined vehicle speed VSP1 which indicates the high-speed running state. If the sensor value is equal to or greater than VSP1, control proceeds to step S55 to select Highway mode. If the sensor value is smaller than VSP1, control proceeds to step S56 to select Sports mode.

Thus, Standard mode is selected when the vehicle is running straight at high speed. Therefore, the attitude of the vehicle body is stabilized by the skyhook control, and also, riding comfort quality is secured by suppressing the vibrations of frequencies in the stiff feel region and the shivering feeling region. In addition, the unsprung mass resonance can be suppressed. Comfort mode is selected when the vehicle is running at low speed. Thus, the unsprung-mass resonance can be suppressed while preventing the vibrations of frequencies in the stiff feel region and the shivering feeling region from being inputted or imparted to the occupant as much as possible.

On the other hand, Highway mode is selected when the vehicle is turning and running at high speed. Thus, the vehicle is controlled using a value obtained by addition of the damping coefficient, and a high damping force can generally be attained. Thus, even when the vehicle is travelling at high speed, the unsprung-mass resonance can be suppressed while the attitude of the vehicle body during a turn is actively secured by the driver-input control. Sports mode is selected when the vehicle is running at low speed. Thus, the unsprung-mass resonance is suppressed while the driver-input control is performed to actively secure the attitude of the vehicle body during a turn, while the skyhook control is appropriately performed. Thus, the vehicle can run with a stable attitude.

Although the running modes are automatically switched through detection of the running or travelling state of the vehicle in the first embodiment, the running mode may be subject to be switched by a switch provided and operated by the driver. Thus, the riding comfort and turning performance in accordance with the intension of the driver can be obtained.

Figure 25:
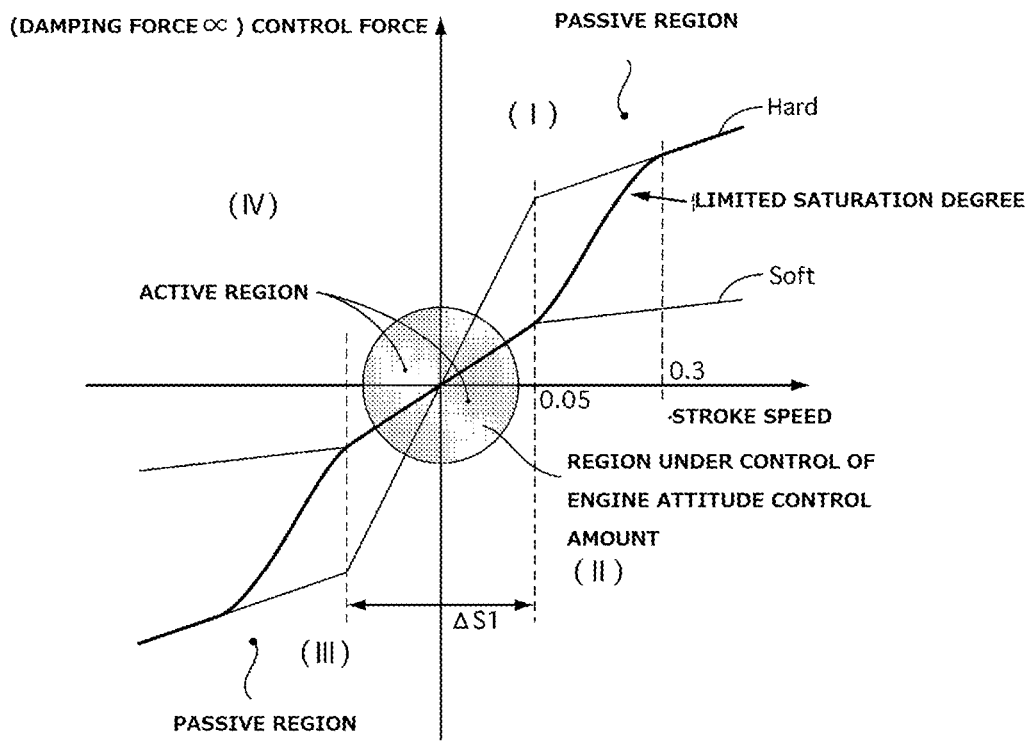
FIG. 25 is a characteristic diagram illustrating the relationship between a control force and a stroke speed in the first embodiment.

(Saturation Degree Limiting Process) The saturation degree arbitration unit 35b has a saturation degree limiting unit 35b1 that limits the saturation degree of arbitration according to the stroke speed. The saturation degree that has been subjected to this saturation degree arbitration process is outputted to the control signal conversion unit 35c. Here, a description is given of the saturation degree limiting process. FIG. 25 is a characteristic diagram showing a relationship of control force with respect to the stroke speed in the first embodiment. The stroke speed is assigned to the horizontal axis, and the control force is assigned to the vertical axis. With respect to damping force characteristics of S/A 3, the vibration suppressing or damping characteristic at the lowest side of the damping force is referred to as Soft, while the vibration suppressing characteristic at the highest side of the damping force is described as Hard. S/A 3 controls the damping force by changing the vibration suppressing or damping characteristic within the range (damping force variable range) sandwiched between the Hard and the Soft lines. It should be noted that the control force is a value proportional to the damping force, and, as the damping force increases, the control force to be imparted to the attitude control will be greater correspondingly. When the damping force is smaller, the control force for performing attitude control decreases correspondingly.

Here, S/A 3 has only a passive function of changing the damping force by changing a diameter of an orifice provided in the piston within S/A 3, and thus does not show an active function to cause the piston to stroke actively. Therefore, as shown in the characteristic diagram of FIG. 25, since the damping force may be exerted in the suppressing direction of the stroke speed on the first quadrant (I) and the third quadrant (III), these regions represent the region in which S/A 3 is controllable. On the second quadrant (II) and the fourth quadrant (IV), it is necessary to output a force in the stroke generating direction. Thus, these regions represent a region in which the control by S/A 3 is not available.

On the other hand, in the case of the control by way of the engine attitude control amount, as described above, both the engine driving torque and the braking torque due to the engine brake may be outputted. Thus, as shown in the characteristic diagram of FIG. 25, although the controllable range is small, the sprung attitude may be controllable in every quadrant around near "zero" stroke speed as a center point. Below, a description is given how the control by the engine driving torque relates to the damping force.

With the length extending between the vehicle center of gravity point to the front wheel axis L1, to the rear wheel axis L2, a front wheel tread Trdf, and a rear wheel tread Trdr, respectively, the damping force exerted on each wheel f (f1 for FL wheel, f2 for FR wheel, f3 for RL wheel and f4 for RR wheel), the bounce requesting force Fz, the roll requesting moment MR, and the pitch requesting moment MP are expressed in the following equation (5):

$$\begin{Bmatrix} FL \rightarrow f_1 \\ FR \rightarrow f_2 \\ RL \rightarrow f_3 \\ RR \rightarrow f_4 \end{Bmatrix} = \begin{bmatrix} \dfrac{L_2}{2(L_1+L_2)} & \dfrac{1}{T_r df} & -\dfrac{1}{2(L_1+L_2)} \\ \dfrac{L_2}{2(L_1+L_2)} & -\dfrac{1}{T_r df} & \dfrac{1}{2(L_1+L_2)} \\ \dfrac{L_1}{2(L_1+L_2)} & \dfrac{1}{T_r df} & \dfrac{1}{2(L_1+L_2)} \\ \dfrac{L_1}{2(L_1+L_2)} & -\dfrac{1}{T_r df} & \dfrac{1}{2(L_1+L_2)} \end{bmatrix} \begin{Bmatrix} F_z \\ M_R \\ M_P \end{Bmatrix} \quad \text{(Equation 5)}$$

Thus, when the pitch moment due to the driving force is converted into the force exerted on each wheel, the following relationship is established.

$$\begin{Bmatrix} f_1 pe \\ f_2 pe \\ f_3 pe \\ f_4 pe \end{Bmatrix} = \begin{bmatrix} -\dfrac{1}{2(L_1+L_2)} \\ -\dfrac{1}{2(L_1+L_2)} \\ \dfrac{1}{2(L_1+L_2)} \\ \dfrac{1}{2(L_1+L_2)} \end{bmatrix} Mpe \quad \text{(Equation 6)}$$

Taking into account that the limit value is set on the engine torque control amount, when the above relationship is plotted in the diagram showing the one wheel damping force-stroke speed diagram, an active control loop is indicated in a low stroke speed range $\Delta S1$ (at or less than 0.05 m/s, for example).

Figure 26A:
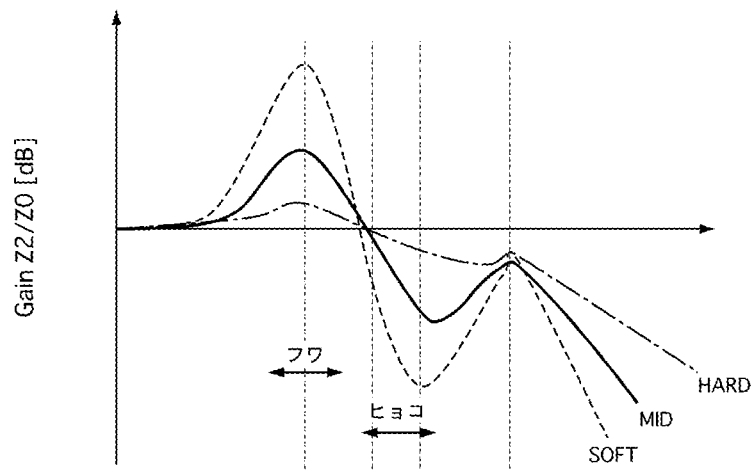
FIG. 26A and FIG. 26B are characteristics diagrams illustrating a gain and stroke speed amplitude with respect to the stroke speed frequency in a conventional vehicle.
Figure 26B:
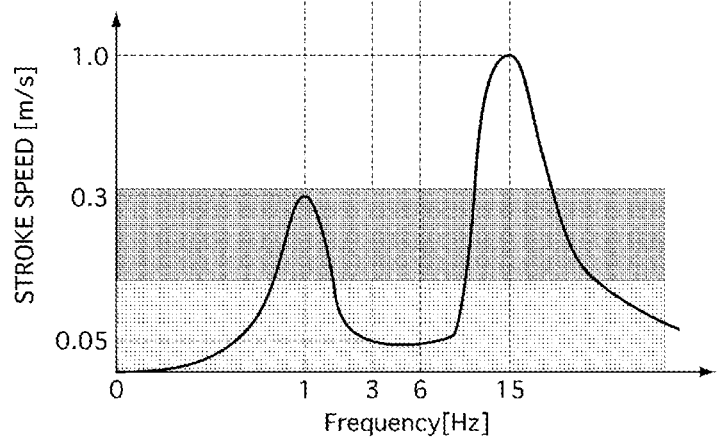

Here, it can be said that, when focusing on the low stroke speed range $\Delta S1$ in FIG. 25, with the configuration having only S/A 3, it might be preferable to set a damping force requested by the skyhook control law. However, it has been found, as a result of an intensive study of the present inventors, that the low stroke speed range $\Delta S1$ is a stroke speed range in which a relatively large amount of the frequency components are contained corresponding to a range between 3 to 6 Hz where the entire human body follows the up-and-down motion and to a range between 6 and 23 Hz representative of a frequency range in which slight and quick vibration is transmitted to part of the human body such as the thighs of the occupant, FIGS. 26A and 26B are characteristic diagrams illustrating the relationship between a gain with respect to the amplitude of frequency of the stroke speed, and the relationship between amplitude of the stroke speed with respect to the frequency of the stroke speed in a conventional vehicle, respectively. In FIG. 26A, the vertical axis shows the gain of the sprung position Z2 in the vertical direction with respect to the position of the road surface position Z0 with three damping characteristics in which the damping characteristics are respectively configured to be soft, hard, and in the middle between the soft and hard characteristics. The vertical axis in FIG. 26B represents the magnitude of the amplitude of the stroke speed. First, the gain shown in FIG. 26A reveals that, regardless of vibration suppression or damping characteristics, a sprung resonance frequency is detected at around 1 Hz, and an unsprung resonance frequency is present near 15 Hz irrespective of the damping characteristic.

When a vehicle is allowed to travel in a plurality of road surface conditions, it has been newly appreciated that the frequency components of the stroke speed is distributed as shown in FIG. 26B. For example, in the frequency region between 3 Hz and 6 Hz, stroke velocity amplitude smaller than the stroke velocity amplitude at the resonant frequency is exhibited. In other words, in the area of loose feel or Fuwa feel region, the stroke velocity amplitude appears in a relatively large magnitude of about 0.3 m/s, whereas, in a stiff feel or Hyoko feel region between 3 to 6 Hz, the stroke velocity amplitude appears in a low stroke velocity region $\Delta S1$ with about 0.05 m/s.

Basically, in controlling the sprung behavior by the skyhook control regardless of the frequency region, it can also be considered preferable to use the damping force over the entire damping force variable region from Soft to Hard in S/A 3. However, when increasing the damping force in this low stroke speed range $\Delta S1$, the vibration transmission efficiency to the vehicle body side would rise, which in turn would lead to deterioration in the high frequency vibration characteristics corresponding to the range between 3 and 23 Hz. In addition, in this frequency range, the human body resonant frequency is also included. Thus, there is a possibility that the riding comfort of the passenger deteriorates. Further, in the low stroke speed range, the amplitude of the stroke speed is low. Thus, a sufficiently high precision is likely to be unavailable by the skyhook control.

Further, for example, a case is assumed in which the sprung mass transitions from a state of lowering at a certain stroke speed with S/A 3 being shrinking to a state in which the sprung mass moves to the raised position, i.e., transitions from the first quadrant (I) to the second quadrant (II). Since S/A 3 only possesses a passive function, a request is outputted for switching from a state in which a great damping force is set by the skyhook control law to a small damping force with the control amount being 0. At this time, the spring force accumulated in S/A 3 is released at once in response to a change to the small amount of damping force, the stroke speed will be reversed in the extension direction and the stated transitions into the first guardant (I) again. These repetitive operations may occur. That is, a great change in the damping coefficient (for example, orifice diameter) within an extremely short time not only causes self-oscillation but this self-excited vibration may induce unsprung resonance with deterioration of the road holding property and riding comfort.

Therefore, in the first embodiment, when the stroke speed is low, the saturation degree is set smaller than when the stroke speed is high. Thus, by reducing the damping force at a low stroke speed, is possible to suppress deterioration of the high frequency vibration characteristics.

Figure 27:
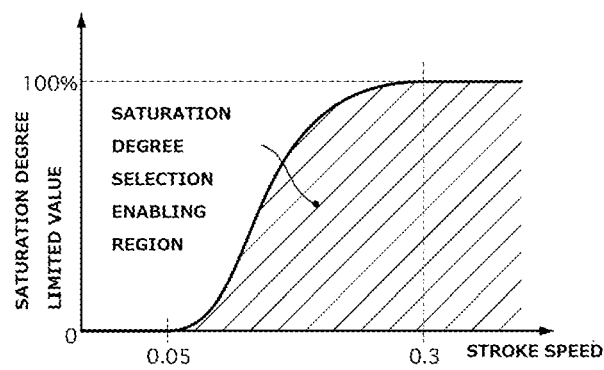
FIG. 27 is a saturation degree limit map in the first embodiment.

FIG. 27 is a saturation degree restriction or limit map in the first embodiment. Restriction or limit is set as shown in the characteristic shown in FIG. 27 such that the saturation degree limited value is set relative to the stroke speed. Specifically, at or less than 0.05 m/s of a first speed, the saturation degree is set to 0% (first saturation), at or more than 0.3 m/s of a second speed greater than the first speed, the saturation degree is set to 100% (second saturation) higher than the first saturation degree. Further, between 0.05 m/s and 0.3 m/s, the saturation degree presents a transitional saturation degree that varies or transitions between 0% and 100%.

The damping force variable control region defined by the saturation degree in a low stroke speed range $\Delta S1$ at 0.05 m/s or less representing the first speed will be set to the closest to the damping characteristic of the Soft property (i.e. is set to a region offset to the low damping force side damping characteristics). In other words, the damping force variable region defined or prescribed to the saturation degree is set to the region excluding a high damping force side damping characteristics. Thus, it is possible to reduce the vibration transmission efficiency to the vehicle body, thereby ensuring riding comfort. Further, with increase in the stroke speed, the transitional saturation degree is set to gradually increase the controllable region closest to the damping characteristics representing the Hard characteristics. Thus, while suppressing the vibration transmission to the vehicle body side, it is possible to stabilize the sprung behavior. With further increase in the stroke speed, since 100% will be set as the second saturation degree, it is possible to stabilize the sprung behavior by fully exhibiting the performance of the S/A 3. Note that, as an alternative method, for example, when the stroke speed is positioned in the low stroke speed range ΔS1, the greatest diameter of orifice representing the least damping force will be fixedly employed. Alternatively, the greatest and the second greatest orifices may be selectively employed for damping force control.

Thus, even limiting the damping force small in a low stroke speed range ΔS1, the low stroke speed range ΔS1 represents a region in which the sprung state may be stabilized by the active control by the engine attitude control. Therefore, even if the damping force control amount by S/A 3 is reduced, it is possible to achieve a stable sprung stable control with respect to the entire vehicle. Note that in the first embodiment, since the saturation degree is set to the region offset to the low damping force side, the low damping force is configured to be generated so that the vibration transmissibility to the occupant to the input of vibration in Hyoko or the stiff feel region may be reduced to thereby improve the riding comfort performance.

Further, in the first embodiment, the calculation of the engine attitude control amount is carried out independently on the basis of the wheel speed. Likewise, the calculation of the S/A attitude control amount is carried out independently on the basis of the wheel speed.

Therefore, even if these amounts are used to control the sprung attitude control independently from each other, control will be performed via the vehicle wheel speed. As a result, the sprung mass behavior will be controlled in cooperation with each other. When reducing the S/A attitude control amount while restricting the skyhook control amount, when necessary, the sprung mass attitude control may be performed appropriately by the engine attitude control without causing mutual interference and the need to monitor each other. This relationship is true also in relation to the brake attitude control amount described above.

Note that, in the first embodiment 1, as shown in FIG. 27, the saturation degree limited value is set at 0% in the low stroke speed range to fix basically to the Soft characteristics, However, in view of avoiding the unstable skyhook control, control is not necessarily set to the Soft characteristics, but the sufficiently is set as a small value as the saturation value so as to restrict the damping characteristics under selection. Alternatively, instead of fixing to the Soft characteristics, the saturation degree may be limited to a region slightly offset to the Hard characteristics side than the Soft characteristics.

Figure 28:
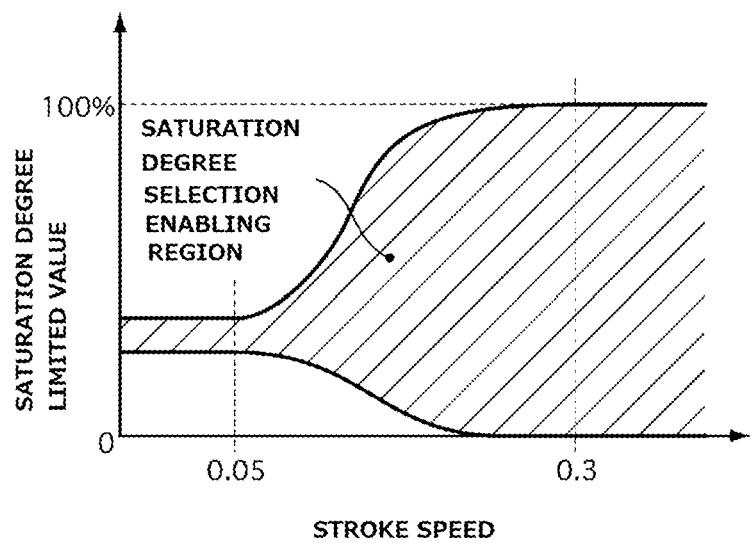
FIG. 28 is the saturation limit map in a second embodiment.

FIG. 28 is a saturation degree limit map in the other embodiment. As will be appreciated, in the low stroke speed range, by setting the selective region of the saturation degree to a predetermined region offset to the lower damping force side damping coefficient, even in the low stroke speed range, a certain extent of damping force is secured and further stabilization of the sprung mass behavior in slight sacrifice of the riding comfort may be realized. Thus, with respect limitation of the saturation degree, various patterns may be contemplated. No specific limitations will be posed in this connection, however.

Further, it is configured to limit the saturation degree arbitrated or adjusted by a saturation degree limit map preset in the first embodiment. Alternatively, the damping coefficient may be configured to be calculated in a restricted form within the skyhook control unit 33a. Then the saturation degree is calculated to produce a saturation degree limited value based on the restricted damping coefficient. In this case, only the value corresponding to a specific damping coefficient is calculated as the saturation degree so that the situation is different from the saturation degree limit map representing the damping force variable region. However, both configurations are virtually the same.

(Releasing process of the saturation degree limit) Now, a description is given of the releasing process of the saturation degree limit. As described above, in the range of low stroke speed, by limiting or restricting the saturation degree, both stabilization of the vehicle behavior and improvement in the riding comfort are achieved. However, it is necessary to secure an initial damping force when the vehicle turns.

In particular, the rolling behavior of the sprung mass is considered to be stabilized most efficiently by S/A 3. Thus, it is necessary to suppress generation of excessive roll by ensuring a sufficient damping force even in situations in which the stroke speed is low. Therefore, in a situation of turning, i.e. when a vehicle turn is predicted and the roll rate occurs, the restriction of the saturation degree described above is configured to be released or removed. Thus, the saturation degree limiting unit 35b1 releases the limitation of the saturation degree in response to a roll rate detected by a roll rate detecting unit 35b2. Therefore, it is possible to increase the damping force at the initial state of cornering to thereby suppress the generation of excessive roll.

Note that, in order to detect a roll rate in the embodiment, it is also possible to predict the occurrence of the roll rate from the relationship between the vehicle speed and the steering angle. Further, in a vehicle that captures the image ahead of the vehicle by a camera or the like, since turning can be predicted from the road surface shape, in a situation in which a turning is predictable before actual turn occurrence, the limitation or restriction of the saturation degree may be configured to be released.

As described above, the first embodiment offers advantageous operational effects listed below.

(1) Provided are;

a first travelling state estimation unit 100, a second travelling state estimation unit 200, and a third travelling state estimation unit 32 (sprung mass behavior detecting means) that detect change in sprung mass behavior of a vehicle;

an engine 1 (power source) that outputs a driving force based on a driving force control to suppress the change in the sprung mass behavior;

S/A 3 (damping force variable shock absorber) that outputs a damping force based on a damping force control to suppress the change in the sprung mass behavior;

a third travelling state estimation unit 32 (stroke speed detecting means) that detects a stroke speed of S/A 3; and a skyhook control unit 33a and a saturation degree limiting unit 35b1 (damping force control amount calculation means) that calculate a damping force control amount based on the damping force control within a range of the damping force variable region prescribed by a saturation degree, in which the saturation degree of the damping force variable region of the damping force variable shock absorber is set lower when the stroke speed is equal to a predetermined value or less than when the stroke speed is greater than the predetermined value, wherein, at least when the stroke speed is equal to the predetermined value or less, the engine 1 is configured to output the driving force based on the driving force control, and S/A 3 is configured to output the damping force corresponding to the damping force control amount calculated by the skyhook control unit 33$a$ and the saturation degree limiting unit 35$b$1 to thereby suppress the change in the sprung mass behavior.

Therefore, when the stroke speed is equal to or less than a predetermined value, by narrowing the damping force variable region and limiting the damping force control, an unnecessary damping force control may be suppressed. Further, when the stroke speed is greater than the predetermined value, by widening the damping force variable region for execution of the damping force control, the vehicle attitude may be sufficiently stabilized irrespective the stroke speed range.

In addition, in a region in which the saturation degree is set low, by performing the driving force control by the engine that is capable of executing the active control, the stability of the overall vehicle may be ensured.

(2) Provided are;
a first travelling state estimation unit 100, a second travelling state estimation unit 200, and a third travelling state estimation unit 32 (sprung mass behavior detecting means) that detect change in sprung mass behavior of a vehicle;

an engine 1 (power source) that outputs a driving force based on a driving force control to suppress the change in the sprung mass behavior;

S/A 3 (damping force variable shock absorber) that outputs a damping force based on a damping force control to suppress the change in the sprung mass behavior;

a third travelling state estimation unit 32 (stroke speed detecting means) that detects a stroke speed of S/A 3; and a skyhook control unit 33$a$ and a saturation degree limiting unit 35$b$1 (damping force control amount calculation means) that calculate a damping force control amount based on the damping force control within a range of the damping force variable region prescribed by a saturation degree in which the saturation degree of the damping force variable region of the damping force variable shock absorber is set lower when the stroke speed is equal to a predetermined value or less than when the stroke speed is greater than the predetermined value, wherein the damping force variable region prescribed to a saturation degree at the stroke speed being equal to a predetermined value or less is offset in a region to a low damping force side damping force characteristics, wherein, at least when the stroke speed is equal to the predetermined value or less, the engine 1 is configured to output the driving force based on the driving force control and S/A 3 is configured to output the damping force corresponding to the damping force control amount calculated by the skyhook control unit 33$a$ and the saturation degree limiting unit 35$b$1 to thereby suppress the change in the sprung mass behavior.

Therefore, when the stroke speed is equal to or less than a predetermined value, by narrowing the damping force variable region and limiting the damping force control, an unnecessary damping force control may be suppressed. Further, when the stroke speed is greater than the predetermined value, by widening the damping force variable region for execution of the damping force control, the vehicle attitude may be sufficiently stabilized irrespective the stroke speed range. Further, since the damping force variable region is set in a region offset to the low damping force side damping characteristics, it is possible to avoid deterioration of riding comfort even at input of high frequency vibrations.

In addition, in a region in which the saturation degree is set low, by performing the driving force control by the engine that is capable of executing the active control, the stability of the overall vehicle may be ensured.

(3) The damping force generated by the low damping force side damping characteristics at an arbitrary stroke speed is configured to be less than the damping force generated by the high damping force side damping characteristics. Thus, even at input of high frequency vibrations, riding comfort may be ensured due to low damping force.

(4) Provided are;
a first travelling state estimation unit 100, a second travelling state estimation unit 200, and a third travelling state estimation unit 32 (sprung mass behavior detecting means) that detect change in sprung mass behavior of a vehicle;

an engine 1 (power source) that outputs a driving force based on a driving force control to suppress the change in the sprung mass behavior;

S/A 3 (damping force variable shock absorber) that outputs a damping force based on a damping force control to suppress the change in the sprung mass behavior;

a third travelling state estimation unit 32 (stroke speed detecting means) that detects a stroke speed of S/A 3; and a skyhook control unit 33$a$ and a saturation degree limiting unit 35$b$1 (damping force control amount calculation means) that calculate a damping force control amount based on the damping force control within a range of the damping force variable region prescribed to a saturation degree, in which the saturation degree of the damping force variable region of the damping force variable shock absorber is set lower when the stroke speed is equal to or less than a predetermined value than the saturation degree when the stroke speed is greater than the predetermined value, wherein the damping force variable region prescribed by the saturation degree when the stroke speed is equal to or less than a predetermined value is set in a region excluding the high damping force side damping characteristics, wherein, at least when the stroke speed is equal to the predetermined value or less, the engine 1 is configured to output the driving force based on the driving force control, and S/A 3 is configured to output the damping force corresponding to the damping force control amount calculated by the skyhook control unit 33$a$ and the saturation degree limiting unit 35$b$1 to thereby suppress the change in the sprung mass behavior.

Therefore, when the stroke speed is equal to or less than a predetermined value, by narrowing the damping force variable region and limiting the damping force control, an unnecessary damping force control may be suppressed. Further, when the stroke speed is greater than the predetermined value, by widening the damping force variable region for execution of the damping force control, the vehicle attitude may be sufficiently stabilized irrespective the stroke speed range. Further, since the damping force variable region is set in a region excluding the high damping force side damping characteristics, it is possible to avoid deterioration of riding comfort even at input of high frequency vibrations.

In addition, in a region in which the saturation degree is set low, by performing the driving force control by the engine that is capable of executing the active control, the stability of the overall vehicle may be ensured.

(5) The damping force generated according to the high damping force side damping characteristics at an arbitrary stroke speed is configured to be greater than the damping force generated according to the low damping force side damping characteristics. Thus, even at input of high frequency vibrations, riding comfort may be ensured due to low damping force.

(6) Provided are;

a first travelling state estimation unit 100, a second travelling state estimation unit 200, and a third travelling state estimation unit 32 (sprung mass behavior detecting means) that detect change in sprung mass behavior of a vehicle;

an engine 1 (power source) that outputs a driving force based on a driving force control to suppress the change in the sprung mass behavior;

S/A 3 (damping force variable shock absorber) that outputs a damping force based on a damping force control to suppress the change in the sprung mass behavior;

a third travelling state estimation unit 32 (stroke speed detecting means) that detects a stroke speed of S/A 3 based on a vehicle wheel speed; and a skyhook control unit 33$a$ and a saturation degree limiting unit 35$b$1 (damping force control amount calculation means) that calculate a damping force control amount based on the damping force control within a range of the damping force variable region prescribed by a saturation degree, in which the saturation degree of the damping force variable region of the damping force variable shock absorber is set lower at the stroke speed being equal to a predetermined value or less than the saturation degree when the stroke speed is greater than the predetermined value, wherein, at least when the stroke speed is equal to the predetermined value or less, the engine 1 is configured to output the driving force based on the driving force control and S/A 3 is configured to output the damping force corresponding to the damping force control amount calculated by the skyhook control unit 33$a$ and the saturation degree limiting unit 35$b$1 to thereby suppress the change in the sprung mass behavior.

Therefore, when the stroke speed is equal to or less than a predetermined value, by narrowing the damping force variable region and limiting the damping force control, an unnecessary damping force control may be suppressed. Further, when the stroke speed is greater than the predetermined value, by widening the damping force variable region for execution of the damping force control, the vehicle attitude may be sufficiently stabilized irrespective the stroke speed range. Further, when detecting the stroke speed based on the vehicle wheel speed, cost effective configuration may be achieved without requiring a costly sensor. Note that, when detecting the stroke speed using the wheel speed, since the amplitude of the stroke speed is small in the low stroke speed range, the precision in the skyhook control might not be fully ensured. In this respect, since the saturation degree in the low stroke speed range is set small, even at deterioration of the accuracy in the skyhook control, an excessively erroneous output is prevented from being output so that vehicle stability will be ensured.

In addition, in a region in which the saturation degree is set low, by performing the driving force control by the engine that is capable of executing the active control, the stability of the overall vehicle may be ensured.

(7) Provided is a reference wheel speed calculation unit 300 (reference wheel speed calculation means) comprising:

a plane motion component extracting unit 301 (first calculation unit) in which first wheel speeds V0FL, V0FR, V0RL, and V0RR as a reference wheel speed of each wheel is calculated based on the vehicle body plan view model taking the wheel speed sensor values as input;

a roll disturbance elimination unit 302 (second calculation unit) in which a second wheel speed V0F, V0R representative of a reference wheel speed of the front and rear wheels based on the vehicle front view model as taking the first wheel speeds V0FL, V0FR, V0RL, V0RR as input;

a pitch disturbance elimination unit 303 (third calculation unit) in which third wheel speeds VbFL, VbFR, VbRL, and VbRR are calculated based on a vehicle body side view model and taking the second front wheel speed, rear wheel speed V0F, V0R as input;

a fore-and-aft wheel exchange unit 305 (fourth calculation unit) in which a fourth wheel speed VbFL, VbFR, VbRL, and VbRR as a reference wheel speeds of each wheel is calculated based on the vehicle body plan view model taking the switched values between the second front wheel and rear wheel speeds V0F, V0R as input;

a wheel speed switching unit 306 which receives the third wheel speeds VbFL, VbFR, VbRL, VbRR and fourth wheel speeds VbFL, VbFR, VbRL, and VbRR, and outputs the third wheel speeds VbFL, VbFR, VbRL, VbRR when the vehicle speed is less than a predetermined vehicle speed while outputting the fourth wheel speed VbFL, VbFR, VbRL, VbRR when the vehicle speed is equal to or greater than the predetermined vehicle speed; and a reference wheel speed re-allocation or re-distribution unit 304 (reference wheel speed calculation means) that calculates a reference wheel speed $\omega 0$ based on the vehicle body plan view model taking the third wheel speeds VbFL, VbFR, VbRL, VbRR or the fourth wheel speeds VbFL, VbFR, VbRL, VbRR output from the wheel speed switching unit 306 as inputs, wherein the third travelling state estimation unit 32 is configured to estimate the stroke speed of S/A 3 based on the difference between the sensor values detected by the wheel speed sensor 5 and the reference vehicle speed (GEO conversion unit 321$c$).

Thus, during a low speed travelling of the vehicle, by using three models to calculate a reference wheel speed eliminating disturbances, the stroke speed may be estimated with good precision to thereby improve the vibration control.

Further, during a high speed travel. by taking the rear wheel speed as the reference wheel speed of the front wheel, a step for eliminating the pitching disturbance may be omitted to thereby secure responsiveness in the vibration control.

(8) The sprung-mass speed calculation unit 322 estimates a sprung mass speed by using a four-wheel model developed based on a bounce term representing a vertical motion of four wheels, a pitch term representing a vertical motion of the front wheels and of the rear wheels, a roll term representing a vertical motion of the left wheels and of the right wheels, and a warp term representing a vertical motion of each pair of diagonal wheels.

More specifically, when developing into the four wheel model from the stroke speed of each wheel, when trying to mode-decompose into sprung mass speed, roll rate, pitch rate and bounce rate, one corresponding component is insufficient to make the solution unstable.

Thus, by introducing the warp rate representing the movement of the diagonal wheels to enable to calculate each component of the sprung mass speed.

(9) Provided are;

a first travelling state estimation unit 100, a second travelling state estimation unit 200, and a third travelling state estimation unit 32 (sprung mass behavior detecting means) that detect change in sprung mass behavior of a vehicle;

an engine 1 (power source) that outputs a driving force based on a driving force control to suppress the change in the sprung mass behavior;

S/A 3 (damping force variable shock absorber) that outputs a damping force based on a damping force control to suppress the change in the sprung mass behavior;

a third travelling state estimation unit 32 (stroke speed detecting means) that detects a stroke speed of S/A 3; and a skyhook control unit 33$a$ and a saturation degree limiting unit 35$b$1 (damping force control amount calculation means) that calculates a damping force control amount based on the damping force control within a range of the damping force variable region prescribed by a saturation degree, in which the saturation degree of the damping force variable region of the damping force variable shock absorber is set lower as the stroke speed decreases when the stroke speed is equal to a predetermined value or less, wherein, at least when the stroke speed is equal to the predetermined value or less, the engine 1 is configured to output the driving force based on the driving force control and S/A 3 is configured to output the damping force corresponding to the damping force control amount calculated by the skyhook control unit 33a and the saturation degree limiting unit 35b1 to thereby suppress the change in the sprung mass behavior.

Therefore, when the stroke speed is equal to or less than a predetermined value, by narrowing the damping force variable region and limiting the damping force control, an unnecessary damping force control may be suppressed. Further, since the saturation degree is set lower as the stroke speed decreases, more stable vehicle behavior may be achieved.

In addition, in a region in which the saturation degree is set low, by performing the driving force control by the engine that is capable of executing the active control, the stability of the overall vehicle may be ensured.

(10) Provided are:

a first travelling state estimation unit 100, a second travelling state estimation unit 200, and a third travelling state estimation unit 32 (sprung mass behavior detecting means) that detect change in sprung mass behavior of a vehicle;

an engine 1 (power source) that outputs a driving force based on a driving force control to suppress the change in the sprung mass behavior;

S/A 3 (damping force variable shock absorber) that outputs a damping force based on a damping force control to suppress the change in the sprung mass behavior;

a third travelling state estimation unit 32 (stroke speed detecting means) that detects a stroke speed of S/A 3; and a skyhook control unit 33a and a saturation degree limiting unit 35b1 (damping force control amount calculation means) that calculates a damping force control amount based on the damping force control within a range of the damping force variable region prescribed by the saturation degree in which the saturation degree of the damping force variable region of S/A 3 is set equal to or lower than a predetermined saturation degree when the stroke speed is equal to or less than a predetermined value, wherein, at least when the stroke speed is equal to the predetermined value or less, the engine 1 is configured to output the driving force based on the driving force control and S/A 3 is configured to output the damping force corresponding to the damping force control amount calculated by the skyhook control unit 33a and the saturation degree limiting unit 35b1 to thereby suppress the change in the sprung mass behavior.

Therefore, when the stroke speed is equal to or less than a predetermined value, by narrowing the damping force variable region equal to or less than a predetermined degree and limiting the damping force control, an unnecessary damping force control may be suppressed. Further, when the stroke speed is greater than the predetermined value, by widening the damping force variable region for execution of the damping force control, the vehicle attitude may be sufficiently stabilized irrespective the stroke speed range.

In addition, in a region in which the saturation degree is set low, by performing the driving force control by the engine that is capable of executing the active control, the stability of the overall vehicle may be ensured.

(11) Provided are:

a first travelling state estimation unit 100, a second travelling state estimation unit 200, and a third travelling state estimation unit 32 (sprung mass behavior detecting means) that detect change in sprung mass behavior of a vehicle;

an engine 1 (power source) that outputs a driving force based on a driving force control to suppress the change in the sprung mass behavior;

S/A 3 (damping force variable shock absorber) that outputs a damping force based on a damping force control to suppress the change in the sprung mass behavior;

a third travelling state estimation unit 32 (stroke speed detecting means) that detects a stroke speed of S/A 3; and a skyhook control unit 33a and a saturation degree limiting unit 35b1 (damping force control amount calculation means) that calculate a damping force control amount based on the damping force control within a damping force variable region prescribed to a saturation degree wherein, when the stroke speed is equal to or below a first speed, the saturation degree of the damping force variable region of the damping force variable shock absorber is set to a first saturation degree, when the stroke speed is equal to or greater than a second speed greater than the first speed, the saturation degree of the damping force variable region of the damping force variable shock absorber is set to a second saturation degree, when the stroke speed is positioned between the first speed and second speed, the saturation degree of the damping force variable region of the damping force variable shock absorber is set to a transitional saturation degree that transitions between the first saturation degree and the second saturation degree, wherein, at least when the stroke speed is equal to a predetermined value or less, the engine 1 is configured to output the driving force based on the driving force control and S/A 3 is configured to output the damping force corresponding to the damping force control amount calculated by the skyhook control unit 33a and the saturation degree limiting unit 35b1 to thereby suppress the change in the sprung mass behavior.

Therefore, in a low stroke speed range equal to or less than the first speed, by setting the saturation degree to 0%, the vibration transmission efficiency to the vehicle body may be reduced and the riding comfort will be ensured. Further, when the stroke speed increases and is positioned between the first speed and the second speed, the transitional saturation degree will be set so that the controllable region will be expanded gradually close to the damping force characteristics having the most Hard characteristics. Thus, with the vibration transmission to the vehicle body being suppressed, stabilization of the sprung mass behavior may be achieved. With further increase in the stroke speed, since 100% is set as the second saturation degree, the stabilization of the sprung mass behavior may be achieved while exhibiting the performance of S/A 3 sufficiently.

In addition, in a region in which the saturation degree is set low, by performing the driving force control by the engine that is capable of executing the active control, the stability of the overall vehicle may be ensured.

(12) The saturation limiting unit 35b1 causes the saturation degree to increase when turning. Therefore, it is possible to suppress the occurrence of excessive roll by ensuring a damping force reliably even in situations in which the stroke speed is low.

(13) The time of turning includes a state in which the turn is predicted before an actual turn. It is thereby possible, it is possible to increase the damping force at the initial stage of cornering to thereby suppress the generation of excessive roll.

(14) A roll rate detecting unit 35b2 (roll rate detecting means) is provided to detect the roll rate of the vehicle, and the saturation degree limiting unit 35b1 allows the saturation degree to be higher as the detected roll rate is increased. In the embodiment, upon detecting the roll rate, the restriction or the constraints on the saturation degree will be released. Thus, it is possible to raise the damping force at the initial stage of turning. It is possible to increase the damping force at the initial stage of cornering to thereby suppress the generation of excessive roll.

(15) When the stroke speed of S/A 3 (damping force variable shock absorber) to perform the damping force control for suppressing changes in the sprung mass behavior is equal to a predetermined value or less, the saturation degree of the damping force variable region will be set lower than the saturation degree when the stroke speed is greater than the predetermined value so that, while the damping force control is being performed within a range of the damping force variable region prescribed to the saturation degree, the driving force control is performed to suppress changes in the sprung mass behavior by the engine 1 (poser source).

Therefore, when the stroke speed is equal to or less than a predetermined value, by narrowing the damping force variable region and limiting the damping force control, an unnecessary damping force control may be suppressed. Further, when the stroke speed is greater than the predetermined value, by widening the damping force variable region for execution of the damping force control, the vehicle attitude may be sufficiently stabilized irrespective the stroke speed range.

In addition, in a region in which the saturation degree is set low, by performing the driving force control by the engine that is capable of executing the active control, the stability of the overall vehicle may be ensured.

(16) Provided are;

a first travelling state estimation unit 100, a second travelling state estimation unit 200, and a third travelling state estimation unit 32 (sprung mass behavior detecting means) that detect change in sprung mass behavior of a vehicle;

S/A 3 (damping force variable shock absorber) that outputs a damping force based on a damping force control to suppress the change in the sprung mass behavior;

a third travelling state estimation unit 32 (stroke speed detecting means) that detects a stroke speed of S/A 3; and a skyhook control unit 33a and a saturation degree limiting unit 35b1 (damping force control amount calculation means) that calculates a damping force control amount based on the damping force control within a range of the damping force variable region prescribed by a saturation degree in which the saturation degree of the damping force variable region of the damping force variable shock absorber during non-turn and the stroke speed is equal to or less than a predetermined value is lower than the saturation degree when the stroke speed is greater than the predetermined value, and the damping force variable region is set in a region offset to a low damping force side damping characteristics.

Therefore, when the stroke speed is equal to or less than a predetermined value, by narrowing the damping force variable region and limiting the damping force control, an unnecessary damping force control may be suppressed. Further, when the stroke speed is greater than the predetermined value, by widening the damping force variable region for execution of the damping force control, the vehicle attitude may be sufficiently stabilized irrespective the stroke speed range.

In addition, the damping force variable region is set in a region offset in the low damping force side damping characteristics. Thus, deterioration in the riding comfort will be avoided even at input of high frequency vibrations and the like. Note that, due to a turning operation, even if the saturation degree is set in a region offset to a low damping force side damping characteristics, the vehicle stability may be ensured.

(17) Provided are;

a first travelling state estimation unit 100, a second travelling state estimation unit 200, and a third travelling state estimation unit 32 (sprung mass behavior detecting means) that detect change in sprung mass behavior of a vehicle;

S/A 3 (damping force variable shock absorber) that outputs a damping force based on a damping force control to suppress the change in the sprung mass behavior;

a third travelling state estimation unit 32 (stroke speed detecting means) that detects a stroke speed of S/A 3; and a skyhook control unit 33a and a saturation degree limiting unit 35b1 (damping force control amount calculation means) that calculate the damping force control amount based on the damping force control within the region of the damping force variable region prescribed by a saturation degree, wherein the saturation degree of the damping force variable region of the damping force variable shock absorber during the non-turning period and when the stroke speed is equal to or less than a predetermined value is set lower than the saturation degree when the stroke speed is greater than the predetermined value and the damping force variable region is set in a region excluding a high damping force side damping characteristics.

Therefore, when the stroke speed is equal to or less than a predetermined value, by narrowing the damping force variable region and limiting the damping force control, an unnecessary damping force control may be suppressed. Further, when the stroke speed is greater than the predetermined value, by setting the damping force variable region in a region excluding a high damping force side damping characteristics, the vehicle attitude may be sufficiently stabilized irrespective the stroke speed range.

In addition, the damping force variable region is set in a region offset in the low damping force side damping characteristics. Thus, deterioration in the riding comfort will be avoided even at input of high frequency vibrations and the like. In addition, the damping force variable region is set in a region offset in the low damping force side damping characteristics. Note that, due to a turning operation, even if the saturation degree is set in a region excluding a high damping force side damping characteristics, the vehicle stability may be ensured.

(18) The time of non-turning or non-cornering indicates the straight running. Therefore, the vehicle stability straight running state is ensured.

(19) A roll rate detecting unit 35b2 (roll rate detecting means) is provided to detect the roll rate of the vehicle, and the vehicle is determined in non-turning when the detected roll rate is less than a predetermined value. In other words, by determining to be in turn when the roll rate is equal to or greater than the predetermined value, it is possible to impose an excessive limitation during the turn and to suppress generation of the excessive roll generation.

(20) Provided are;

a first travelling state estimation unit 100, a second travelling state estimation unit 200, and a third travelling state estimation unit 32 (sprung mass behavior detecting means) that detect change in sprung mass behavior of a vehicle;

S/A 3 (damping force variable shock absorber) that outputs a damping force based on a damping force control to suppress the change in the sprung mass behavior;

a third travelling state estimation unit 32 (stroke speed detecting means) that detects a stroke speed of S/A 3 based on a wheel speed; and a skyhook control unit 33a and a saturation degree limiting unit 35b1 (damping force control amount calculation means) that calculate the damping force control amount based on the damping force control within a region of the damping force variable region prescribed by the saturation degree, wherein the saturation degree of the damping force variable region of the damping force variable shock absorber is set lower than the saturation degree when the stroke speed is greater than the predetermined value.

Therefore, when the stroke speed is equal to or less than a predetermined value, by narrowing the damping force variable region and limiting the damping force control, an unnecessary damping force control may be suppressed.

Further, when detecting the stroke speed based on the vehicle wheel speed, cost effective configuration may be achieved without requiring a costly sensor. Note that, when detecting the stroke speed using the wheel speed, since the amplitude of the stroke speed is small in the low stroke speed range, the precision in the skyhook control might not be fully ensured. In this respect, since the saturation degree in the low stroke speed range is set small, even at deterioration of the accuracy in the skyhook control, an excessively erroneous output is prevented from being output so that vehicle stability will be ensured.

(21) Provided is a reference wheel speed calculation unit, comprising:

a plane motion component extracting unit 301 (first calculation unit) in which a first wheel speed V0FL, V0FR, V0RL, and V0RR as a reference wheel speed of each wheel is calculated based on the vehicle body plan view model taking the wheel speed sensor value as input;

a roll disturbance elimination unit 302 (second calculation unit) in which a second wheel speed V0F, V0R representative of a reference wheel speed of the front and rear wheels based on the vehicle front view model as taking a first wheel speed V0FL, V0FR, V0RL, V0RR as input;

a pitch disturbance elimination unit 303 (third calculation unit) in which third wheel speeds VbFL, VbFR, VbRL, and VbRR are calculated based on a vehicle body side view model and taking the second wheel speeds V0F, V0R as input;

a fore-and-aft wheel exchange unit 305 (fourth calculation unit) in which a fourth wheel speed VbFL, VbFR, VbRL, and VbRR as a reference wheel speed of each wheel is calculated based on the vehicle body plan view model taking the switched values between the second front wheel and rear wheel speeds V0F, V0R as input;

a wheel speed switching unit 306 which receives the third wheel speeds VbFL, VbFR, VbRL, VbRR and fourth wheel speeds VbFL, VbFR, VbRL, and VbRR, and outputs the third wheel speeds VbFL, VbFR, VbRL, VbRR when the vehicle speed is less than a predetermined vehicle speed while outputting the fourth wheel speed VbFL, VbFR, VbRL, VbRR when the vehicle speed is equal to or greater than the predetermined vehicle speed; and a reference wheel speed re-distribution unit 304 (reference wheel speed calculation means) that calculates a reference wheel speed $\omega 0$ based on the vehicle body plan view model taking the third wheel speeds VbFL, VbFR, VbRL, VbRR or the fourth wheel speeds VbFL, VbFR, VbRL, VbRR as inputs, wherein the third travelling state estimation means 32 is configured to estimate the stroke speed of S/A 3 based on the difference between the sensor values detected by the wheel speed sensor 5 and the reference vehicle speed (GEO transform unit 321c).

Thus, during a low speed travelling of the vehicle, by using three models to calculate a reference wheel speed while eliminating disturbances, the stroke speed may be estimated preciously to thereby improve the vibration control.

Further, during a high speed travel. by taking the rear wheel speed as the reference wheel speed of the front wheel, a step for eliminating the pitching disturbance may be omitted to thereby secure responsiveness in the vibration control.

(22) The sprung-mass speed calculation unit 322 estimates a sprung mass speed by using a four-wheel model developed based on a bounce term representing a vertical motion of four wheels, a pitch term representing a vertical motion of the front wheels and of the rear wheels, a roll term representing a vertical motion of the left wheels and of the right wheels, and a warp term representing a vertical motion of each pair of diagonal wheels.

More specifically, when developing into the four wheel model from the stroke speed of each wheel, when trying to mode-decompose into sprung mass speed, roll rate, pitch rate and bounce rate, one corresponding component is insufficient to make the solution unstable.

(23) Provided are;

a first travelling state estimation unit 100, a second travelling state estimation unit 200, and a third travelling state estimation unit 32 (sprung mass behavior detecting means) that detect change in sprung mass behavior of a vehicle;

S/A 3 (damping force variable shock absorber) that outputs a damping force based on a damping force control to suppress the change in the sprung mass behavior;

a third travelling state estimation unit 32 (stroke speed detecting means) that detects a stroke speed of S/A 3; and a skyhook control unit 33a and a saturation degree limiting unit 35b1 (damping force control amount calculation means) that calculates the damping force control amount based on the damping force control within a region of the damping force variable region prescribed by a saturation degree in which the saturation degree of the damping force variable region of the damping force variable shock absorber is set lower as the stroke speed decreases when the stroke speed is equal to a predetermined value or less.

Therefore, when the stroke speed is equal to or less than a predetermined value, by narrowing the damping force variable region and limiting the damping force control, an unnecessary damping force control may be suppressed. Further, since the saturation degree is set lower as the stroke speed decreases, more stable vehicle behavior may be achieved.

(24) Provided are:

a first travelling state estimation unit 100, a second travelling state estimation unit 200, and a third travelling state estimation unit 32 (sprung mass behavior detecting means) that detect change in sprung mass behavior of a vehicle;

S/A 3 (damping force variable shock absorber) that outputs a damping force based on a damping force control to suppress the change in the sprung mass behavior;

a third travelling state estimation unit 32 (stroke speed detecting means) that detects a stroke speed of S/A 3; and a skyhook control unit 33a and a saturation degree limiting unit 35b1 (damping force control amount calculation means) that causes the S/A 3 to output a damping force based on the damping force control within a range of the damping force variable region prescribed to a saturation degree in which the saturation degree of the damping force variable region of the damping force variable shock absorber is set less than a predetermined saturation degree and the damping force variable region is set in a region offset to a low damping force side damping characteristics when the stroke speed is equal to or less than a predetermined speed.

Therefore, when the stroke speed is equal to or less than a predetermined value, by narrowing the damping force variable region and limiting the damping force control, an unnecessary damping force control may be suppressed. Further, when the stroke speed is greater than the predetermined value, by widening the damping force variable region for execution of the damping force control, the vehicle attitude may be sufficiently stabilized irrespective the stroke speed range. In addition, since the saturation degree is set lower as the stroke speed decreases, an even stabilized vehicle behavior may be achieved.

Further, since the damping force variable region is set in a region offset to the low damping force side damping characteristics, it is possible to avoid deterioration of riding comfort even at input of high frequency vibrations.

(25) Provided are:

a first travelling state estimation unit 100, a second travelling state estimation unit 200, and a third travelling state estimation unit 32 (sprung mass behavior detecting means) that detect change in sprung mass behavior of a vehicle;

S/A 3 (damping force variable shock absorber) that outputs a damping force based on a damping force control to suppress the change in the sprung mass behavior;

a third travelling state estimation unit 32 (stroke speed detecting means) that detects a stroke speed of S/A 3; and a skyhook control unit 33a and a saturation degree limiting unit 35b1 (damping force control amount calculation means) that calculate a damping force control amount based on the damping force control within a damping force variable region prescribed to a saturation degree wherein, when the stroke speed is equal to or below a first speed, the saturation degree of the damping force variable region of the damping force variable shock absorber is set to a first saturation degree, when the stroke speed is equal to or greater than a second speed greater than the first speed, the saturation degree of the damping force variable region of the damping force variable shock absorber is set to a second saturation degree, when the stroke speed is positioned between the first speed and second speed, the saturation degree of the damping force variable region of the damping force variable shock absorber is set to a transitional saturation degree that transitions between the first saturation degree and the second saturation degree.

Therefore, in a low stroke speed range equal to or less than the first speed, by setting the saturation degree to 0%, the vibration transmission efficiency to the vehicle body may be reduced and the riding comfort will be ensured. Further, when the stroke speed increases and is positioned between the first speed and the second speed, the transitional saturation degree will be set so that the controllable region will be expanded gradually close to the damping force characteristics having the most Hard characteristics. Thus, with the vibration transmission to the vehicle body being suppressed, stabilization of the sprung mass behavior may be achieved. With further increase in the stroke speed, since 100% is set as the second saturation degree, the stabilization of the sprung mass behavior may be achieved while exhibiting the performance of S/A 3 sufficiently.

(26) Provided are:

a first travelling state estimation unit 100, a second travelling state estimation unit 200, and a third travelling state estimation unit 32 (sprung mass behavior detecting means) that detect change in sprung mass behavior of a vehicle;

S/A 3 (damping force variable shock absorber) that outputs a damping force based on a damping force control to suppress the change in the sprung mass behavior;

a third travelling state estimation unit 32 (stroke speed detecting means) that detects a stroke speed of S/A 3; and a skyhook control unit 33a and a saturation degree limiting unit 35b1 (damping force control amount calculation means) that causes the S/A 3 to output a damping force based on the damping force control within a range of the damping force variable region prescribed to a saturation degree in which the saturation degree of the damping force variable region of S/A 3 where the amplitude of the stroke speed is smaller than the sprung mass resonance amplitude detected at the sprung mass resonance frequency is set lower than the saturation degree at the sprung mass resonance amplitude.

Therefore, when the amplitude of the stroke speed is smaller than the sprung mass resonance amplitude detected at the sprung mass resonance frequency, i.e., when detected as a stiff feeling region, by narrowing the damping force variable region and to limit the damping force control, an unnecessary damping force control is suppressed. Further, when detected as a loose feeling region, by widening the damping force variable regions to execute the damping force control, the vehicle attitude may be fully stabilized irrespective of the stroke speed ranges. Further, by avoiding the situation in which the damping force will be high, it is possible to avoid deterioration of riding comfort associated with input of the high frequency vibrations.

(27) Provided are:

a first travelling state estimation unit 100, a second travelling state estimation unit 200, and a third travelling state estimation unit 32 (sprung mass behavior detecting means) that detect change in sprung mass behavior of a vehicle;

S/A 3 (damping force variable shock absorber) that outputs a damping force based on a damping force control to suppress the change in the sprung mass behavior;

a third travelling state estimation unit 32 (stroke speed detecting means) that detects a stroke speed of S/A 3; and a skyhook control unit 33a and a saturation degree limiting unit 35b1 (damping force control amount calculation means) that causes the S/A 3 to output a damping force based on the damping force control within a range of the damping force variable region prescribed to a saturation degree in which the saturation degree of the damping force variable region of S/A 3 where the amplitude of the stroke speed is smaller than the unsprung mass resonance amplitude detected at the unsprung mass resonance frequency is set lower than the saturation degree at the unsprung mass resonance amplitude.

Therefore, when the amplitude of the stroke speed is smaller than the unsprung mass resonance amplitude detected at the unsprung mass resonance frequency, i.e., when detected as a stiff feeling region, by narrowing the damping force variable region and to limit the damping force control, an unnecessary damping force control is suppressed. Further, when detected as a loose feeling region, by widening the damping force variable regions to execute the damping force control, the vehicle attitude may be fully stabilized irrespective of the stroke speed ranges. Further, by avoiding the situation in which the damping force will be high, it is possible to avoid deterioration of riding comfort associated with input of the high frequency vibrations.

(28) Provided are:

a first travelling state estimation unit 100, a second travelling state estimation unit 200, and a third travelling state estimation unit 32 (sprung mass behavior detecting means) that detect change in sprung mass behavior of a vehicle;

S/A 3 (damping force variable shock absorber) that outputs a damping force based on a damping force control to suppress the change in the sprung mass behavior;

a third travelling state estimation unit 32 (stroke speed detecting means) that detects a stroke speed of S/A 3; and a skyhook control unit 33a and a saturation degree limiting unit 35b1 (damping force control amount calculation means) that causes the S/A 3 to output a damping force based on the damping force control within a range of the damping force variable region prescribed to a saturation degree in which the saturation degree of the damping force variable region of S/A 3 where the amplitude of the stroke speed is at a predetermined amplitude detected at a predetermined frequency region between the sprung resonance frequency and the unsprung mass resonance frequency is smaller than the saturation degree with a resonance amplitude detected at either the sprung mass resonance amplitude or at the unsprung mass resonance amplitude.

Therefore, when the amplitude of the stroke speed is at a predetermined amplitude detected in a predetermined frequency region between the sprung mass resonance frequency and the unsprung mass resonance frequency, i.e., when detected as a stiff feeling region, by narrowing the damping force variable region and to limit the damping force control, an unnecessary damping force control is suppressed. Further, when detected as a loose feeling region, by widening the damping force variable regions to execute the damping force control, the vehicle attitude may be fully stabilized irrespective of the stroke speed ranges. Further, by avoiding the situation in which the damping force will be high, it is possible to avoid deterioration of riding comfort associated with input of the high frequency vibrations.

(29) The predetermined frequency region refers to a frequency range between 2Hz and 7Hz. This shows a region between the sprung resonance frequency and the unsprung resonance frequency. However, it is preferable to set the saturation degree low at a predetermined amplitude where the stiff feeling region is detected in a frequency range between 3Hz and 6Hz. Thus, the high frequency vibration in the stiff feeling region is suppressed and deterioration in the high frequency vibration may be avoided.

Second Embodiment

Now, a second embodiment will be described. Since the basic configuration is the same as in the first embodiment, only the differences are described.

Figure 29:
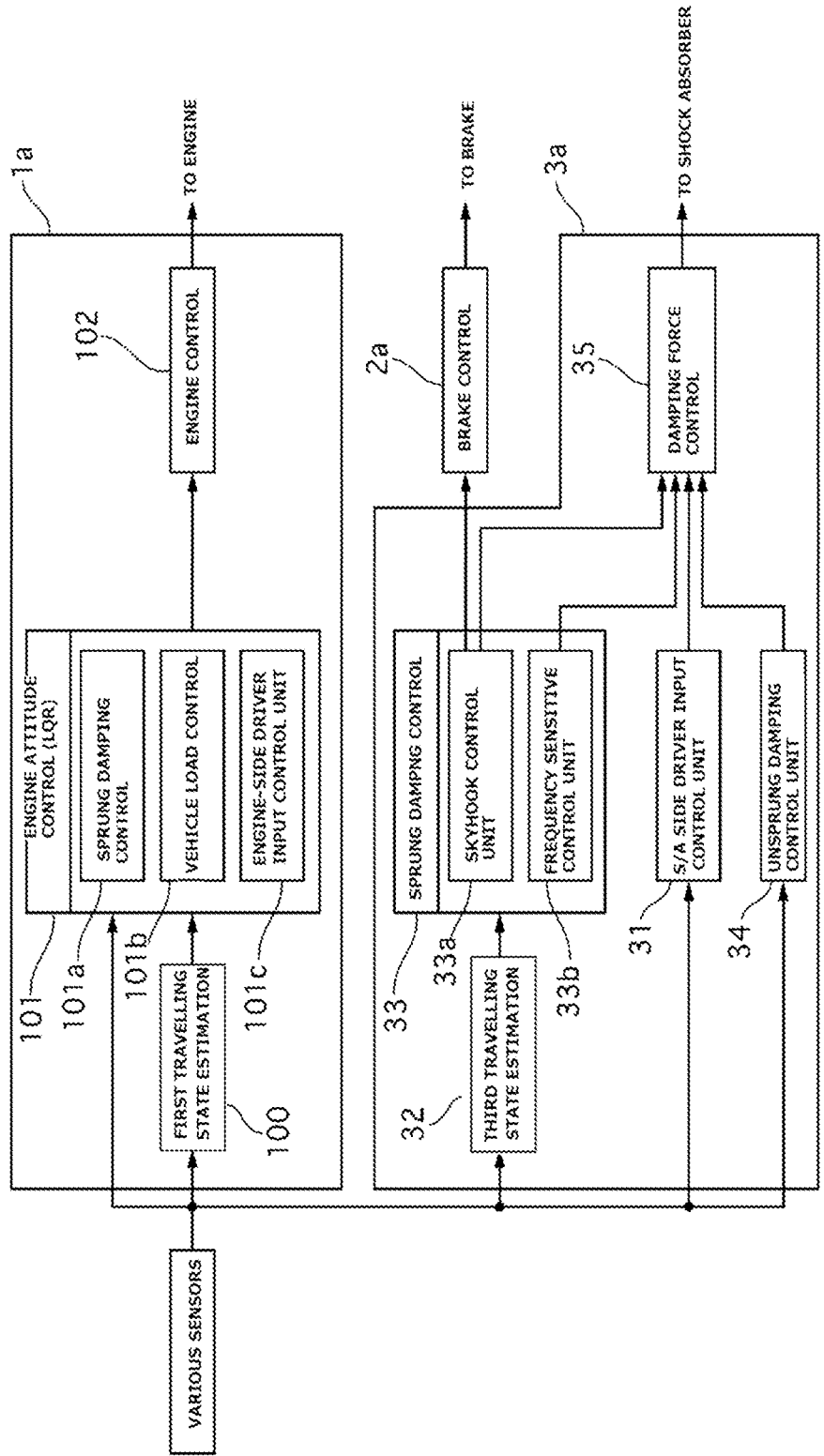
FIG. 29 is control block diagram illustrating a control configuration of a control device in the second embodiment.

FIG. 29 is a control block diagram showing a control structure of a control device for a vehicle according to the second embodiment. In the first embodiment, an engine controller 1a, a brake controller 2a, and S/A controller 3a are provided and each actuator is provided with a feedback system independent from each other. In contrast, in the second embodiment, with respect to the engine controller 1a, an independent wheel speed feedback control system is provided in the same manner as in the first embodiment. The difference resides in that, with respect to the brake 20 and S/A 3, a wheel speed feedback system is provided which is subject to control by the control amount calculated by the skyhook control unit 33a.

[Configuration of skyhook control unit] In a control device for a vehicle according to the second embodiment, as the actuator to achieve the sprung attitude control, an engine 1, a brake 20, and a S/A 3 are provided. Of these, in the skyhook control unit 33a, with respect to S/A 3, the bounce rate, roll rate, and pitch rate are made as the objects to be controlled. With respect to the brake, the pitch rate is made as the object to be controlled. Here, in order to control the sprung state by allocating control amounts to a plurality of actuators of different operation, it is necessary to use a common control amount. In the second embodiment, with the use of the sprung speeds estimated by the running or travelling state estimation unit 32 described above, it is possible to determine the controlled variable for each actuator.

Skyhook control amount in bounce direction may be expressed;

$FB = CskyB \cdot dB$

Skyhook control amount in roll direction may be expressed;

$FR = CskyR \cdot dR$

Skyhook control amount in pitch direction may be expressed;

$FP = CskyP \cdot dP$

FB is sent to S/A 3 as bounce attitude control amount, FR is sent to the damping force control unit 35 as a roll attitude control amount since FR involves a control to be executed by S/A 3 only.

Figure 30:
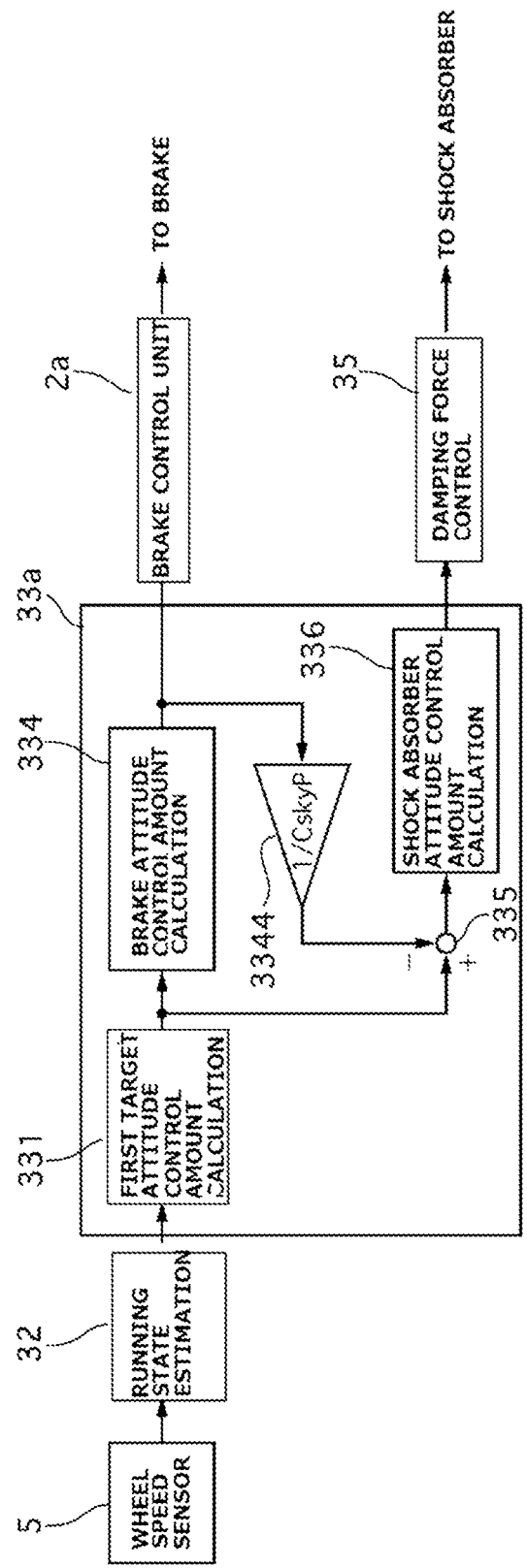
FIG. 30 is a control block diagram illustrating a control amount calculation process for each actuator when performing a pitch control in the second embodiment.

Now, a description is given of the skyhook control amount FP in the pitch direction. The pitch control is performed by the brake 20 and S/A 3. FIG. 30 is a control block diagram representing each actuator control amount calculation processing when performing the pitch control in the second embodiment. The skyhook control unit 33a is provided with a first target attitude control amount calculation unit 331 that calculates a target pitch rate applicable to all actuators as control amount, a brake attitude amount calculation unit 334 that calculates a brake attitude control amount to be achieved by the brake 20, and an S/A attitude control amount calculation unit 336 that calculates an S/A attitude control amount, respectively.

In the skyhook control in the present system, since it is the first priority to be operated so as to suppress the pitch rate, the pitch rate is output without change in the first target attitude control amount calculation unit 331 (hereinafter, the pitch rate is referred to as a first target attitude control amount). The brake attitude control amount calculation unit 334 is set with a limit value that limits the braking torque control amount in order not to give a sense of discomfort to the occupant (note that. details of the limit value will be described later in detail limits) is set. Thus, the braking torque control amount, when converted in the longitudinal acceleration, is limited to remain within a predetermined longitudinal acceleration (limit value determined by discomfort of the occupant. the lifetime, etc.)

In a second target attitude control amount calculation unit 335, a second target attitude control amount is calculated as the first target attitude control amount and the brake attitude control amount for outputting to S/A attitude control amount calculation unit 336. In S/A attitude control amount calculation unit 336, a pitch attitude is output according to the second target attitude control amount. In the damping force control unit 35, the bounce attitude control amount, based on the roll attitude control amount, and the pitch attitude control amount (hereinafter, referred to collectively as S/A attitude control amount) the damping force control amount is calculated for outputting to S/A 3.

As described above, with respect to the pitch rate, the first target attitude control amount is calculated, and then the S/A attitude control amount is calculated based on the second target attitude control amount representative of the difference between the first target attitude control amount and the brake attitude control amount. Thus, since the pitch rate control amount performed by S/A 3 may be reduced by the control of brake 20, the controllable region of S/A 3 may be reduced through the control of the brake 20. Thus, it is possible to narrow the controllable region of S/A 3 so that the sprung attitude control may be achieved by an inexpensive S/A 3.

Further, by increasing the amount of control S/A 3, the damping force increases essentially. The increase in damping force means to intend to exhibit a hard suspension characteristic. If high-frequency vibration is input from the road surface, high-frequency input can be easily transmitted thereby impairing the comfort of the driver (hereinafter, referred to as deterioration of high frequency vibration characteristics). In contrast, it is possible to avoid the deterioration of the high-frequency vibration characteristics by suppressing the pitch rate by an actuator, such as the brake 20, which does not affect the vibration transmission characteristics due to the road surface input to thereby reduce the amount of control of the S/A 3. The above-mentioned effects can be obtained by determining the control amount of the brake 2 before S/A 3.

The invention claimed is:

1. A vehicle control device, comprising:
   a sprung mass behavior detecting means that detects change in sprung mass behavior of a vehicle;
   a power source that outputs a driving force based on a driving force control to suppress the change in the sprung mass behavior;
   a damping force variable shock absorber that outputs a damping force based on a damping force control to suppress the change in the sprung mass behavior;
   a stroke speed detecting means that detects a stroke speed of the damping force variable shock absorber; and
   a damping force control amount calculation means that calculates a damping force control amount based on the damping force control within a range of a damping force variable region with a predetermined width prescribed by a saturation degree, in which the saturation degree of the damping force variable region of the damping force variable shock absorber is set lower when the stroke speed is equal to a predetermined value or less than when the stroke speed is greater than the predetermined value,
   wherein, when the stroke speed is equal to or less than the predetermined value, the damping force variable region excludes high damping force side damping characteristics, and an engine is configured to output the driving force based on the driving force control, and the damping force variable shock absorber is configured to output the damping force corresponding to the damping force control amount to thereby suppress the change in the sprung mass behavior, and
   wherein the damping force generated according to the high damping force side damping characteristics at an arbitrary stroke speed is configured to be greater than the damping force generated according to a low damping force side damping characteristics.

2. The vehicle control device of claim 1,
   wherein the damping force corresponding to the damping force control amount is calculated by a skyhook control unit and a saturation degree limiting unit to thereby suppress the change in the sprung mass behavior.

3. The vehicle control device as claimed in claim 2, wherein the damping force generated according to the low damping force side damping characteristics at an arbitrary stroke speed is configured to be less than the damping force generated according to a high damping force side damping characteristics.

4. The vehicle control device as claimed in claim 1, wherein roll rate detecting means is provided to detect a roll rate of the vehicle, and the damping force control amount calculation means allows the saturation degree to be higher as the detected roil rate is increased.

5. The vehicle control device of claim 1, wherein, at least when the stroke speed is equal to the predetermined value or less, the power source is configured to output the driving force based on the driving force control and the damping variable shock absorber is configured to output the damping force corresponding to the damping force control amount calculated by the damping force control amount calculation means to thereby suppress the change in the sprung mass behavior.

6. A vehicle control device comprising:
   a sprung mass behavior detecting means that detects change in sprung mass behavior of a vehicle;
   a power source that outputs a driving force based on a driving force control to suppress the change in the sprung mass behavior;
   a damping force variable shock absorber that outputs a damping force based on a damping force control to suppress the change in the sprung mass behavior;
   a stroke speed detecting means that detects a stroke speed of the damping force variable shock absorber; and
      a damping force control amount calculation means that calculates a damping force control amount based on the damping force control within a range of a damping force variable region with a predetermined width prescribed by a saturation degree, in which the saturation degree of the damping force variable region of the damping force variable shock absorber is set lower when the stroke speed is equal to a predetermined value or less than when the stroke speed is greater than the predetermined value,
   wherein, at least when the stroke speed is equal to the predetermined value or less, the power source is configured to output the driving force based on the driving force control and the damping force variable shock absorber is configured to output the damping force corresponding to the damping force control amount calculated by the damping force control amount calculation means to thereby suppress the change in the sprung mass behavior, the system further comprising a reference wheel speed calculation unit which comprises:
   a first calculation unit in which a first wheel speed as a reference wheel speed of each wheel is calculated based on the vehicle body plan view model taking the wheel speed as input;
   a second calculation unit in which a second wheel speed representative of a reference wheel speed of the front and rear wheels is calculated based on the vehicle front view model as taking the first wheel speed as input;
   a third calculation unit in which a third wheel speed is calculated as a reference wheel speed for all wheels based on a vehicle body side view model and taking the second front wheel speed as input; and
   a reference wheel speed calculation means that calculates a final reference wheel speed for each wheel based on the vehicle body plan view model taking the third wheel speed as input, wherein the stroke speed detection means is configured to estimate the stroke speed based on the difference between the wheel speed of each wheel and the final reference wheel speed.

7. The vehicle control device as claimed in claim 6, wherein the sprung-mass speed calculation unit estimates a sprung mass speed by using a four-wheel model developed based on a bounce term representing a vertical motion of four wheels, a pitch term representing a vertical motion of the front wheels and of the rear wheels, a roll term representing a vertical motion of the left wheels and of the right wheels, and a warp term representing a vertical motion of each pair of diagonal wheels.

8. A vehicle control device, comprising:
   a sprung mass behavior detecting means that detects change in sprung mass behavior of a vehicle;

a power source that outputs a driving force based on a driving force control to suppress the change in the sprung mass behavior;

a damping force variable shock absorber that outputs a damping force based on a damping force control to suppress the change in the sprung mass behavior;

a stroke speed detecting means that detects a stroke speed of damping force variable shock absorber; and a damping force control amount calculation means that calculates a damping force control amount based on the damping force control within a range of the damping force variable region with a predetermined width prescribed to the saturation degree in which the saturation degree of the damping force variable region of damping force variable shock absorber is set equal to or lower than a predetermined saturation degree when the stroke speed is equal to or less than a predetermined value, wherein, at least when the stroke speed is equal to the predetermined value or less, the power source is configured to output the driving force based on the driving force control and damping force variable shock absorber is configured to output the damping force corresponding to the damping force control amount calculated by the damping force control amount calculation means to thereby suppress the change in the sprung mass behavior, and wherein the damping force control amount calculation means causes the saturation degree to increase during a turn.

9. The vehicle control device of claim 8, wherein the saturation degree of the damping force variable region of the damping force variable shock absorber is set lower as the stroke speed decreases when the stroke speed is equal to the predetermined value or less.

10. A vehicle control device, comprising:

a sprung mass behavior detecting means that detects change in sprung mass behavior of a vehicle;

a power source that outputs a driving force based on a driving force control to suppress the change in the sprung mass behavior;

a damping force variable shock absorber that outputs a damping force based on a damping force control to suppress the change in the sprung mass behavior;

a stroke speed detecting means that detects a stroke speed of the damping force variable shock absorber; and a damping force control amount calculation means that calculates a damping force control amount based on the damping force control within a range of a damping force variable region with a predetermined width prescribed by a saturation degree, in which the saturation degree of the damping force variable region of the damping force variable shock absorber is set lower when the stroke speed is equal to a predetermined value or less than when the stroke speed is greater than the predetermined value, wherein the damping force control amount calculation means causes the saturation degree to increase during a turn.

11. The vehicle control device as claimed in claim 10, wherein a time of the turn includes a state in which the turn is predicted before an actual turn.

12. A vehicle control device, comprising:

a sprung mass behavior detecting means that detects change in sprung mass behavior of a vehicle;

a damping force variable shock absorber that outputs a damping force based on a damping force control to suppress the change in the sprung mass behavior;

a stroke speed detecting means that detects a stroke speed of the damping force variable shock absorber; and a damping force control means that outputs to the damping force variable shock absorber a damping force based on the damping force control within a range of the damping force variable region with a predetermined width prescribed to a saturation degree in which the saturation degree of the damping force variable region of the damping force variable shock absorber during non-turn and the stroke speed is equal to or less than a predetermined value is lower than the saturation degree when the stroke speed is greater than the predetermined value, and the damping force variable region is set in a region offset to a low damping force side damping characteristics, wherein the damping force variable region is set in a region excluding a high damping force side damping characteristic.

13. The vehicle control device as claimed in claim 12, wherein the non-turning period refers to a time of straight running.

14. The vehicle control device as claimed in claim 12, wherein a roll rate detecting means is provided to detect a roll rate of the vehicle, and the vehicle is determined in non-turning when the detected roll rate is less than a predetermined value.

15. A vehicle control device, comprising:

a sprung mass behavior detecting means that detects change in sprung mass behavior of a vehicle;

a damping force variable shock absorber that outputs a damping force based on a damping force control to suppress the change in the sprung mass behavior;

a stroke speed detecting means that detects a stroke speed of the damping force variable shock absorber based on a wheel speed;

a damping force control means that outputs to the damping force variable shock absorber the damping force based on the damping force control within a region of the damping force variable region with a predetermined width prescribed by the saturation degree, wherein the saturation degree of the damping force variable region of the damping force variable shock absorber is set lower when the stroke speed is equal to or less than a predetermined value than the saturation degree when the stroke speed is greater than the predetermined value; and a reference wheel speed calculation unit including:

a first calculation unit in which a first wheel speed as a reference wheel speed of each wheel is calculated based on a vehicle body plan view model taking the wheel speed as input;

a second calculation unit in which a second wheel speed representative of reference wheel speed of the front and rear wheels is calculated based on a vehicle front view model as taking the first wheel speed as input;

a third calculation unit in which a third wheel speed is calculated as a reference wheel speed for all wheels based on a vehicle body side view model and taking the second wheel speed as input; and a reference wheel speed calculation means that calculates a final reference wheel speed for each wheel based on the vehicle body plan view model taking the third wheel speed as input.

16. A vehicle control device, comprising:

a sprung mass behavior detecting means that detects change in sprung mass behavior of a vehicle;

a damping force variable shock absorber that outputs a damping force based on a damping force control to suppress the change in the sprung mass behavior;

a stroke speed detecting means that detects a stroke speed of the damping force variable shock absorber based on a wheel speed;

a damping force control means that outputs to the damping force variable shock absorber the damping force based on the damping force control within a region of the damping force variable region with a predetermined width prescribed by the saturation degree, wherein the saturation degree of the damping force variable region of the damping force variable shock absorber is set lower when the stroke speed is equal to or less than a predetermined value than the saturation degree when the stroke speed is greater than the predetermined value, wherein the sprung mass behavior detecting means estimates change in the sprung mass behavior by using a four-wheel model developed based on a bounce term representing a vertical motion of four wheels, a pitch term representing a vertical motion of the front wheels and of the rear wheels, a roll term representing a vertical motion of the left wheels and of the right wheels, and a warp term representing a vertical motion of each pair of diagonal wheels.

17. The vehicle control device of claim 16, wherein the saturation degree of the damping force variable region of the damping force variable shock absorber is set lower as the stroke speed decreases when the stroke speed is equal to the predetermined value or less.

18. A vehicle control device, comprising:

a sprung mass behavior detecting means that detects change in sprung mass behavior of a vehicle;

a damping force variable shock absorber that outputs a damping force based on a damping force control to suppress the change in the sprung mass behavior;

a stroke speed detecting means that detects a stroke speed of the damping force variable shock absorber; and a damping force control amount calculation means that causes the damping force variable shock absorber to output a damping force based on the damping force control within a range of the damping force variable region with a predetermined width prescribed to a saturation degree in which the saturation degree of the damping force variable region of the damping force variable shock absorber where an amplitude of the stroke speed is smaller than a sprung mass resonance amplitude detected at a sprung mass resonance frequency is set lower than the saturation degree at the sprung mass resonance amplitude, wherein the damping force control amount calculation means causes the saturation degree to increase during a turn.

19. A vehicle control device, comprising:

a sprung mass behavior detecting means that detects change in sprung mass behavior of a vehicle;

a damping force variable shock absorber that outputs a damping force based on a damping force control to suppress the change in the sprung mass behavior;

a stroke speed detecting means that detects a stroke speed of the damping force variable shock absorber; and a damping force control amount calculation means that causes the damping force variable shock absorber to output a damping force based on the damping force control within a range of the damping force variable region with a predetermined width prescribed to a saturation degree in which the saturation degree of the damping force variable region of the damping force variable shock absorber where an amplitude of the stroke speed is smaller than an unsprung mass resonance amplitude detected at an unsprung mass resonance frequency is set lower than the saturation degree at the unsprung mass resonance amplitude.

20. A vehicle control device, comprising:

a sprung mass behavior detecting means that detects change in sprung mass behavior of a vehicle;

a damping force variable shock absorber that outputs a damping force based on a damping force control to suppress the change in the sprung mass behavior;

a stroke speed detecting means that detects a stroke speed of the damping force variable shock absorber; and a damping force control amount calculation means that causes the damping force variable shock absorber to output a damping force based on the damping force control within a range of the damping force variable region with a predetermined width prescribed to a saturation degree in which the saturation degree of the damping force variable region of the damping force variable shock absorber where an amplitude of the stroke speed is at a predetermined amplitude detected at a predetermined frequency region between a sprung resonance frequency and an unsprung mass resonance frequency is smaller than the saturation degree with a resonance amplitude detected at either the sprung mass resonance amplitude or at the unsprung mass resonance amplitude.

21. The vehicle control device as claimed in claim 20, wherein the predetermined frequency region refers to a frequency range between 2Hz and 7Hz.

* * * * *